United States Patent
Vaughan et al.

(10) Patent No.: US 7,707,075 B2
(45) Date of Patent: Apr. 27, 2010

(54) SYSTEM AND METHOD FOR MANAGING INVENTORY

(75) Inventors: Richard A. Vaughan, Seattle, WA (US); Jeffrey T. Brinker, Seattle, WA (US); Tomas A. D. Matos, Sammamish, WA (US)

(73) Assignee: Expedia, Inc., Bellevue, WA (US)

( * ) Notice: Subject to any disclaimer, the term of this patent is extended or adjusted under 35 U.S.C. 154(b) by 0 days.

(21) Appl. No.: 09/932,441

(22) Filed: Aug. 17, 2001

(65) Prior Publication Data

US 2003/0036981 A1 Feb. 20, 2003

(51) Int. Cl.
*G06F 17/60* (2006.01)

(52) U.S. Cl. .......................................... 705/28
(58) Field of Classification Search ............ 705/28
See application file for complete search history.

(56) References Cited

U.S. PATENT DOCUMENTS

| | | | |
|---|---|---|---|
| 4,887,218 A | 12/1989 | Natarajan | |
| 5,526,257 A * | 6/1996 | Lerner | 705/10 |
| 5,732,398 A | 3/1998 | Tagawa | |
| 5,832,452 A * | 11/1998 | Schneider et al. | 705/5 |
| 5,948,040 A | 9/1999 | DeLorme et al. | |
| 5,953,706 A | 9/1999 | Patel | |
| 5,960,414 A | 9/1999 | Rand et al. | |
| 6,023,679 A | 2/2000 | Acebo | |
| 6,058,373 A * | 5/2000 | Blinn et al. | 705/26 |
| 6,085,976 A | 7/2000 | Sehr | |
| 6,094,640 A | 7/2000 | Goheen | |
| 6,119,094 A | 9/2000 | Lynch et al. | |
| 6,134,534 A | 10/2000 | Walker et al. | |
| 6,249,772 B1 | 6/2001 | Walker et al. | |
| 6,263,315 B1 | 7/2001 | Talluri | |
| 6,341,269 B1 * | 1/2002 | Dulaney et al. | 705/22 |
| 6,386,451 B1 | 5/2002 | Sehr | |
| 6,397,199 B1 * | 5/2002 | Goodwin, III | 705/400 |
| 6,493,724 B1 * | 12/2002 | Cusack et al. | 705/10 |
| 6,642,946 B1 * | 11/2003 | Janes et al. | 715/854 |
| 6,782,350 B1 * | 8/2004 | Burnley et al. | 702/186 |
| 6,868,403 B1 | 3/2005 | Wiser et al. | |
| 6,926,203 B1 | 8/2005 | Sehr | |
| 7,177,825 B1 * | 2/2007 | Borders et al. | 705/26 |
| 7,236,976 B2 | 6/2007 | Breitenbach | |
| 2002/0082877 A1 * | 6/2002 | Schiff et al. | 705/5 |
| 2002/0082956 A1 * | 6/2002 | Peterson et al. | 705/28 |
| 2002/0087366 A1 | 7/2002 | Collier et al. | |
| 2002/0173996 A1 * | 11/2002 | Murch et al. | 705/5 |
| 2002/0184060 A1 * | 12/2002 | Schmitz et al. | 705/6 |
| 2003/0023463 A1 * | 1/2003 | Dombroski et al. | 705/5 |
| 2003/0028451 A1 | 2/2003 | Ananian | |

(Continued)

FOREIGN PATENT DOCUMENTS

CA 2332083 A1 7/2001

(Continued)

*Primary Examiner*—Pierre E Elisca
(74) *Attorney, Agent, or Firm*—Knobbe Martens Olson & Bear LLP

(57) ABSTRACT

A system and method for managing inventory data are provided. A travel server obtains inventory data from one or more inventory suppliers and stores the inventory data as SKU group, SKU and SKU inventory records. The travel server utilizes the SKU group, SKU and SKU inventory records to process user requests for available inventory and supplier inventory action requests.

56 Claims, 25 Drawing Sheets

U.S. PATENT DOCUMENTS

| | | | |
|---|---|---|---|
| 2003/0033211 A1* | 2/2003 | Haines et al. | 705/26 |
| 2004/0243478 A1* | 12/2004 | Walker et al. | 705/26 |
| 2004/0254835 A1* | 12/2004 | Thomas et al. | 705/14 |
| 2005/0273396 A1* | 12/2005 | Aliabadi et al. | 705/26 |
| 2007/0061450 A1* | 3/2007 | Burnley et al. | 709/224 |

FOREIGN PATENT DOCUMENTS

| | | | |
|---|---|---|---|
| JP | 11-328223 A | | 11/1999 |
| JP | 2006164054 A | * | 6/2006 |
| WO | WO/01/40978 A2 | | 7/2001 |

* cited by examiner

SYSTEM AND METHOD FOR MANAGING INVENTORY

CROSS REFERENCE TO RELATED APPLICATION

This application cross references U.S. application Ser. No. 09/932,263, filed Aug. 17, 2001.

FIELD OF THE INVENTION

In general, the present invention relates to an on-line travel information and reservation system, and more particularly, to a system and method for managing inventory item queries and reservation requests for a variety of inventory items.

BACKGROUND OF THE INVENTION

Traditional travel services and agencies have a long-standing history in the travel industry. Generally described, the traditional travel service provides a consumer access to travel related suppliers to allow the consumer to reserve or purchase various goods or services. For example, the traditional travel service can provide a link between a consumer and a number of travel related industries such as airlines, hotels, tour guide companies, cruise ship companies, etc. However, to utilize the traditional travel service, the consumer is required to visit a physical location of the travel service to carry out a desired task. Often, the consumer makes multiple trips, all of which typically must be completed during the business hours of the travel service. Accordingly, some traditional travel service implementations become deficient in terms of limited number of geographical store locations for consumers to visit and times of availability for conducting business. Additionally, although some traditional travel services offer telephonic access, the consumer can also experience variations in quality related to varying travel service personnel and/or availability related to limited travel service hours of operation.

The development of computing devices, such as personal computers, mobile phones, personal digital assistants, and a number of corresponding computer-based businesses, have attempted to reduce the need for the traditional travel service. In a particularly common embodiment, a number of travel services utilize the computing devices to communicate with consumers. More specifically, travel services can utilize the Internet, a vast number of computers often referred to as the "Web" or "World Wide Web," to establish communication. Such travel services are generally referred to as Web-based travel services.

As applied to a Web-based travel service, many of the travel services located on the Web interact with a potential traveler by presenting the consumer with one or more interactive displays, generally referred to as Web sites, to transact business by allowing the user to make purchases, modifications, inquiries, etc. By interacting with the Web site, such as by entering data through a keyboard, or by selecting graphically presented criteria, a consumer can manipulate the computer and Web site to accomplish various travel-related tasks. Moreover, the consumer can accomplish these tasks at various times throughout the day, and without being required to physically travel to a particular physical travel service location.

The relationship between a Web-based travel service and the travel product suppliers can be characterized as either an agency configuration or a merchant configuration. In an agency configuration, the Web-based travel service serves as an intermediary between the consumer computing devices and the various suppliers, but the travel service does not possess complete selling rights of the inventory items being sold (such as hotel rooms, airline tickets, cruise packages, etc.). Instead, each inventory item is subject to the partial control of the supplier, in terms of managing inventory item pricing to the consumer. For example, under an agency configuration, if a potential traveler requests an airline ticket, the agency configured travel service may be able to complete the consumer's reservation, but the agency may not be restricted from setting the price the consumer will pay for the ticket. Additionally, the agency configured travel service may have limited control of how funds are collected from the consumer. Thus, with regard to revenue in an agency configuration, the Web-based travel service typically is limited to receiving a percentage of the transaction amount received by the supplier. Alternatively, the Web-based travel service may collect a flat service fee for each processed transaction. Still further, the Web-based travel server may receive a flat fee to advertise a particular supplier's inventory items.

The agency configuration can become deficient in a variety of manners. In one aspect, the Web-based travel service is limited to offering consumers only the inventory items the supplier has available at the moment of communication between the supplier and the travel service. For example, a conventional Web-based travel service often advertises inventory items that may not actually be available when a reservation request is sent to the supplier. Moreover, even if the inventory items are available, the Web-based travel service has limited control over the price of the products/services offered to the consumer. Thus, the Web-based travel service has reduced control of the revenue that it can generate from various consumer transactions in different economic markets. Thus, an agency configured travel service can be a deficient approach to providing Web-based travel services.

In contrast, under a merchant configuration, a Web-based travel service is allotted inventory (such as hotel rooms, airline seats, cruise suites, etc.) by various suppliers such that the Web-based travel service has control as to how the inventory is disposed. For example, a hotel supplier may sell/consign a room in the hotel to the Web-based travel service such that the Web-based travel service has the ability to sell use of the hotel room to a consumer. Unlike an agency configuration, the Web-based travel service has more control over the price of the inventory item and how funds are collected from the consumer. More specifically, with regard to revenue, in the merchant configuration, the Web-based travel service's revenue is typically based on the difference between the price a consumer pays the Web-based travel service and the cost the service must pay the supplier. Thus, the merchant configured Web-based travel service has more control of its revenue stream.

In a typical merchant configuration commercial transaction, the Web-based travel service is allotted blocks of inventory items, such as blocks of airline seats on a particular flight for a series of dates (e.g., 10 seats of Flight 492 for the month of August) or blocks of hotel rooms for a range of dates (e.g., 5 penthouse suites at ABC hotel for the week of August 1-7). The allotment of blocks of inventory items can be referred to as batch inventory. To manage the batch inventory, the Web-based travel service sorts the inventory items according to one or more identifying characteristics. For example, distinguishable pieces of hotel room batch inventory items can be processed and stored according to identifying characteristics such as location (e.g., name of hotel and address), a type of room (e.g., suite), and date of use (e.g., Jul. 28, 2001). Accordingly, depending on the number of different types of meeting items, the hotel room inventory items could be sorted by hotel name, then by room type, and then by date of existence.

Although the conventional characteristics sorting method facilitates inventory management in a merchant configuration, deficiencies can arise with batch inventory items having matching identifiable characteristics, but differing non-identifying characteristics. With reference to the above example, assume the hotel allots a Web-based travel service a block of rooms having a set of identifiable characteristics. In accordance with the traditional sorting method, the Web-based travel service stores the inventory items according to its identifiable characteristics (e.g., 20 double rooms at XYZ hotel on May 21, 2001). However, if the hotel supplier allots a second batch of inventory having identical matching characteristics (30 additional double rooms at XYZ hotel on May 21, 2001) but different non-identifiable characteristics (e.g., cost, terms of restriction, service fees), the conventional processing method can become deficient in a variety of situations.

With reference to a potential consumer price/supplier cost deficiency, because all similar inventory items are sorted together, the traditional sorting and processing method does not efficiently manage different cost/price of individual inventory items (e.g., the 20 double rooms at $50 and the 30 double rooms at $65). To account for variations in supplier cost, some merchant configured travel services average a supplier cost/consumer price across the total number of an allotted instances of the particular inventory item. With reference to the previous example this would equal the travel service considering 50 rooms at $59. Thus, the Web-based travel services could potentially lose revenue by under-charging some consumers and attempt to make up the difference by over-charging other consumers. One skilled in the relevant art will appreciate that this approach can be deficient because it assumes that the travel service will sell its entire allotment of inventory items, which may not always occur. Furthermore, there can be some negative consumer impact in promoting varied consumer priced transactions.

Another deficiency associated with processing batch inventory relates to some portion of the batch inventory items having limitation of use restrictions. For example, assume that a supplier allots the first block of rooms to the hotel with no limitations of use and subsequently allots the second batch inventory of rooms (having identical identifying characteristics) with the limitation that the rooms from the first batch of inventory must be sold first. Under a conventional merchant configured travel service, because the rooms have identical identifying characteristics, the Web-based travel service stores the room data together. However, because the conventional Web-based travel service cannot typically distinguish from which batch inventory allotment an individual piece of inventory item corresponds to, the restriction of use may be difficult to enforce. Thus, the conventional travel service has various deficiencies in attempting to process batch inventory.

Another deficiency associated with the conventional merchant configuration, and not necessarily limited to batch inventory, arises from an attempt by a Web-based travel service to coordinate with various suppliers. In a typical embodiment, the allotment of inventory items depends on communication between a travel service agent and a supplier agent utilizing several modes of communication, such as telephone, electronic mail, fax, and traditional mail. Often, the inability to establish continuous communications can cause delays throughout various portions of the transaction, such as during notification of an offer for an allotment, confirmation of an acceptance of an allotment, as well as negotiation of additional inventory or varying terms. For example, assume that a Web-based travel agent is attempting to negotiate with a hotel supplier to receive an allotment of a block of rooms at a specific cost. The negotiation can be delayed because there may not be a standardized form of communication between the supplier and the travel service (e.g., one agent prefers the telephone while the other utilizes regular mail). Moreover, even if the parties can establish communications and an agreement can be reached between the supplier agent and a travel service agent, the agreement may not be properly documented for later use. For example, a travel service accounting department, removed from the agent, may have trouble providing a supplier the proper authorization to receive the allotment of rooms at the negotiated price during an account reconciliation, especially if the accounts are being reconciled some time later. Thus, the traditional merchant configured travel agency inefficiently must establish procedures for interfacing with each potential supplier and must also establish adequate record keeping practices for each type of supplier.

Thus, there is a need for a system and method for managing inventory items to facilitate consumer inventory items queries. More specifically, there is a need for a system and method for managing consumer and supplier requests for managing inventory items having a variety of characteristics.

SUMMARY OF THE INVENTION

A system and method for managing inventory data are provided. A travel server obtains inventory data from one or more inventory suppliers and stores the inventory data as SKU group, SKU and SKU inventory records. The travel server utilizes the SKU group, SKU and SKU inventory records to process user requests for available inventory and supplier inventory action requests.

In accordance with an aspect of the present invention, a method for processing an available inventory item query corresponding to inventory defined by stock-keeping unit (SKU) information is provided. The SKU information includes a SKU record defining a primary level of detail for the inventory item. The SKU information further includes a SKU inventory record corresponding to the SKU record and defining a second level of detail for the inventory items. A travel server obtains an available inventory query including a set of criteria for identifying matching inventory items. The travel server determines at least one inventory item matching the query criteria. The inventory item corresponds to at least one SKU group, SKU, and SKU inventory record. The travel server transmits the data associated with the matching SKU group, SKU, and SKU inventory records.

In accordance with another aspect of the present invention, a method for processing an inventory action request corresponding to one or more inventory items defined by stock-keeping unit (SKU) information is provided. The SKU information includes a SKU record defining a primary level of detail for the inventory item. The SKU information further includes a SKU inventory record corresponding to the SKU record and defining a second level of detail for the inventory items. A travel server obtains an inventory action request including an identification of at least one specific SKU group, SKU and SKU inventory record. The travel server processes the inventory action request. The travels server then transmits the results of the processing of the inventory action request.

In accordance with a further aspect of the present invention, a computer-readable medium having computer-readable components for managing one or more inventory items is provided. The computer-readable components include a SKU component operable to define a primary level of characteristics for one or more inventory items. The computer-readable components also include a SKU inventory component corresponding to the SKU component and operable to define a second level of characteristics for an inventory item.

In accordance with yet another aspect of the present invention, a system for managing inventory utilizing stock-keeping unit (SKU) information is provided. The SKU information includes a SKU record defining a primary level of detail for the inventory item. The SKU information further includes a SKU inventory record corresponding to the SKU record and defining a second level of detail for the inventory items. The system includes at least one client computing device operable to issue an inventory query including a set of criteria for selecting one or more inventory items. The system also includes a travel server operable to store one or more inventory items defined by SKU group, SKU, and SKU inventory records. The travel server is further operable to identify one or more SKU group, SKU, and SKU inventory records matching the inventory query criteria submitted by the client computing device.

In accordance with still a further aspect of the present invention, a system for managing one or more inventory items utilizing stock-keeping unit (SKU) information is provided. The SKU information includes a SKU record defining a primary level of detail for the inventory item. The SKU information further includes a SKU inventory record corresponding to the SKU record and defining a second level of detail for the inventory items. The system includes at least one inventory supplier operable to provide the one or more inventory items. The system also includes a travel server operable to store the supplier inventory items as SKU group, SKU and SKU inventory records. The travel server is further operable to communicate with the inventory suppliers and process inventory action requests corresponding to the SKU group, SKU, and SKU inventory records.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF ILLUSTRATIVE EMBODIMENTS

Figure 1:
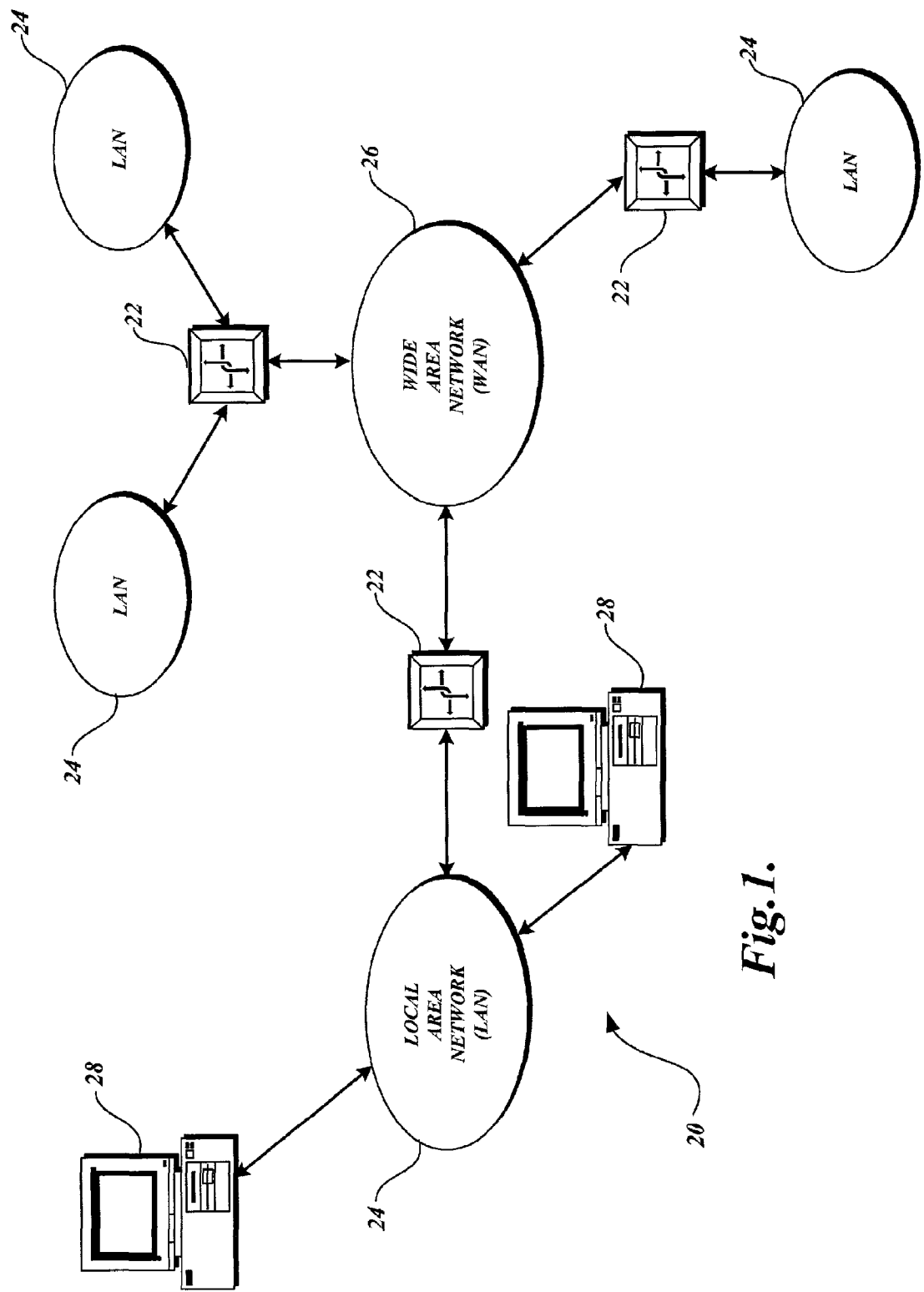
FIG. 1 is a block diagram of a representative portion of the Internet.

As described above, aspects of the present invention are embodied in a World Wide Web ("WWW") or ("Web") site accessible via the Internet. As is well known to those skilled in the art, the term "Internet" refers to the collection of networks and routers that use the Transmission Control Protocol/Internet Protocol ("TCP/IP") to communicate with one another. A representative section of the Internet 20 is shown in FIG. 1, where a plurality of local area networks ("LANs") 24 and a wide area network ("WAN") 26 are interconnected by routers 22. The routers 22 are special purpose computers used to interface one LAN or WAN to another. Communication links within the LANs may be twisted wire pair, coaxial cable, or optical fiber, while communication links between networks may utilize 56 Kbps analog telephone lines, 1 Mbps digital T-1 lines, 45 Mbps T-3 lines or other communications links known to those skilled in the art.

Furthermore, computers 28 and other related electronic devices can be remotely connected to either the LANs 24 or the WAN 26 via a modem and temporary telephone or wireless link. It will be appreciated that the Internet 20 comprises a vast number of such interconnected networks, computers, and routers and that only a small, representative section of the Internet 20 is shown in FIG. 1.

The Internet has recently seen explosive growth by virtue of its ability to link computers located throughout the world. As the Internet has grown, so has the WWW. As is appreciated by those skilled in the art, the WWW is a vast collection of interconnected or "hypertext" documents written in Hyper-Text Markup Language ("HTML"), or other markup languages, that are electronically stored at "WWW sites" or "Web sites" throughout the Internet. Other interactive hypertext environments may include proprietary environments such as those provided in America Online or other online service providers, as well as the "wireless Web" provided by various wireless networking providers, especially those in the cellular phone industry. It will be appreciated that the present invention could apply in any such interactive hypertext environments, however, for purposes of discussion, the Web is used as an exemplary interactive hypertext environment with regard to the present invention.

A Web site is a server/computer connected to the Internet that has massive storage capabilities for storing hypertext documents and that runs administrative software for handling requests for those stored hypertext documents. Embedded within a hypertext document are a number of hyperlinks, e.g., highlighted portions of text which link the document to another hypertext document possibly stored at a Web site elsewhere on the Internet. Each hyperlink is assigned a Uniform Resource Locator ("URL") that provides the exact location of the linked document on a server connected to the Internet and describes the document. Thus, whenever a hypertext document is retrieved from any web server, the document is considered retrieved from the World Wide Web. Known to those skilled in the art, a web server may also include facilities for storing and transmitting application programs, such as application programs written in the JAVA® programming language from Sun Microsystems, for execution on a remote computer. Likewise, a web server may also include facilities for executing scripts and other application programs on the web server itself.

A consumer or other remote access user may retrieve hypertext documents from the World Wide Web via a web browser program. A web browser, such as Netscape's NAVIGATOR® or Microsoft's Internet Explorer, is a software application program for providing a graphical user interface to the WWW. Upon request from the consumer via the web browser, the web browser locates and retrieves the desired hypertext document from the appropriate web server using the URL for the document and the HTTP protocol. HTTP is a higher-level protocol than TCP/IP and is designed specifically for the requirements of the WWW. HTTP runs on top of TCP/IP to transfer hypertext documents between server and client computers. The WWW browser may also retrieve programs from the web server, such as JAVA applets, for execution on the client computer.

In general, the present invention relates to a system and method for managing inventory item queries and reservation requests. More specifically, in one embodiment of the present invention, a system and method for managing travel related inventory item queries and travel related reservation transactions between inventory item suppliers and consumers is provided. One skilled in the relevant art will appreciate that an inventory item includes any tangible good or article of merchandise, such as admission tickets, passes, consumer products, that may be transferred from a supplier to a consumer. Inventory items can also include rights to goods or services, such as a right to occupy a hotel room for a particular evening, a right to a seat on an airplane flight, a right to occupy a particular cabin on a cruise ship, that are provider by a supplier, or an agent of the supplier. Moreover, it will be understood that an inventory item can a single good or service and group of substantially identical goods or services (e.g., a block of rooms at a hotel).

Depending on the desired transaction, a merchant configured travel management system may be utilized to facilitate consumer inquiries for inventory item availability and to process consumer requests for inventory item reservations. Additionally, the travel management system may be utilized to facilitate various supplier-based inventory item action requests and to process supplier notifications of consumer reservations. However, one skilled in the relevant art will appreciate that the disclosed embodiments are done for illustrative purposes and should not be construed as limiting.

Figure 2:
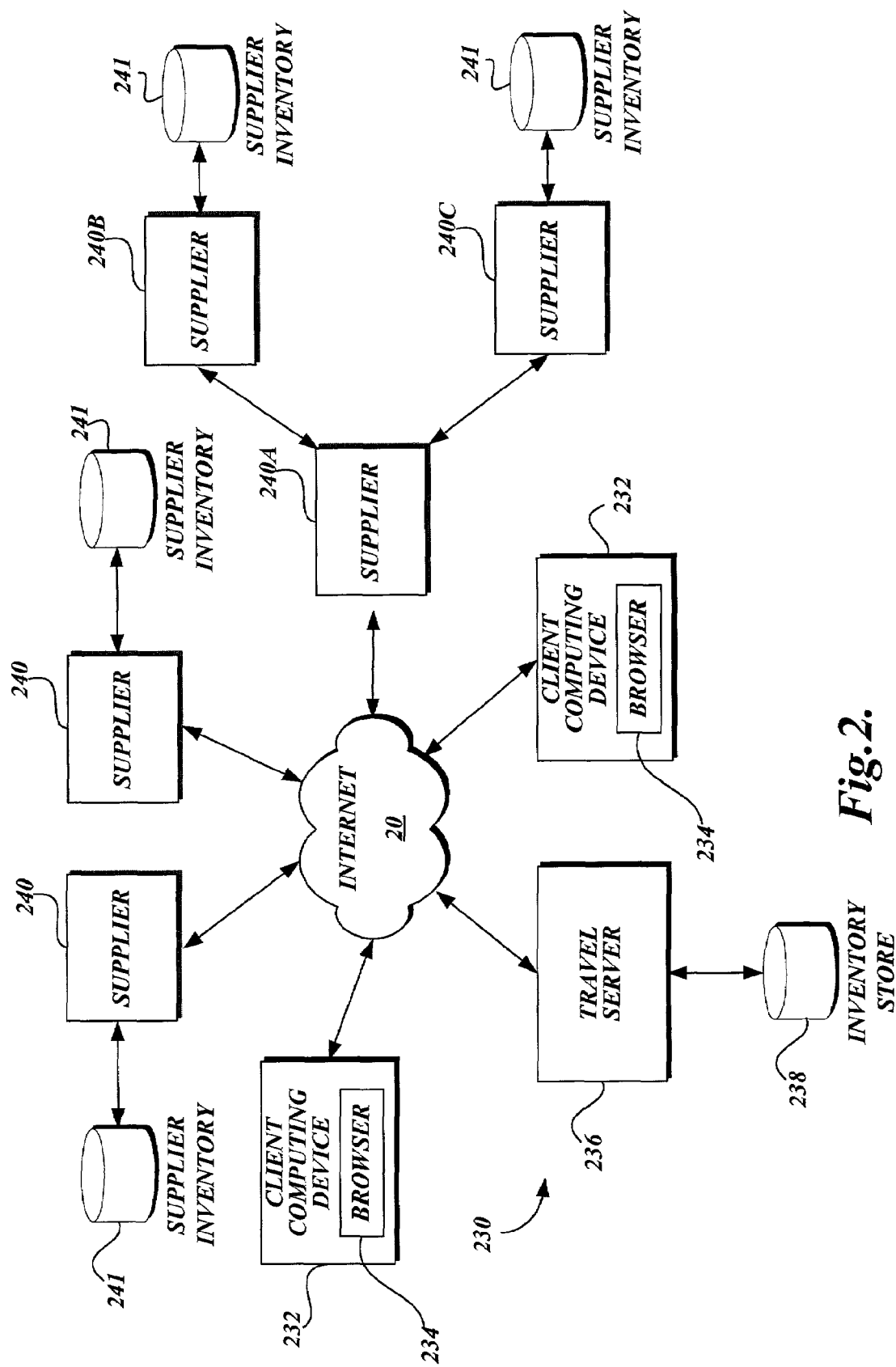
FIG. 2 is a block diagram illustrative of a travel management system formed in accordance with the present invention.

FIG. 2 is a block diagram illustrative of a travel management system 230 formed in accordance with the present invention. As illustrated in FIG. 2, the travel management system 230 includes one or more client computing devices 232 and a travel server 236 having an inventory store 238 for storing inventory items allotted to the travel server. Additionally, the travel management system 230 includes one or more supplier systems 240 having a supplier inventory store 241. In one embodiment of the present invention, the client-computing devices 232 communicate with the travel management system 230 via a Web browser 234 stored in the memory of client computing device 232.

As also illustrated in FIG. 2, the various components of the travel management system 230 communicate by transferring data and receiving data over a standard communication network, such as the Internet 20. However, one skilled in the relevant art will appreciate that the client-computing devices 232, travel server 236, and suppliers 240 may also transfer/receive data via a dedicated or semi-dedicated communication network, such as a private travel-based computer network. Moreover, although only two client computing devices 232 are illustrated in FIG. 2, one skilled in the relevant art will appreciate that any number of client computing devices 232 or suppliers 240 may be utilized in accordance with travel management system 230 of the present invention. Similarly, as illustrated in FIG. 2, the travel management system 230 may indirectly interface with supplier systems via other intermediary suppliers 204A, such as illustrated in suppliers 240A, 240B and 240C.

Figure 3:
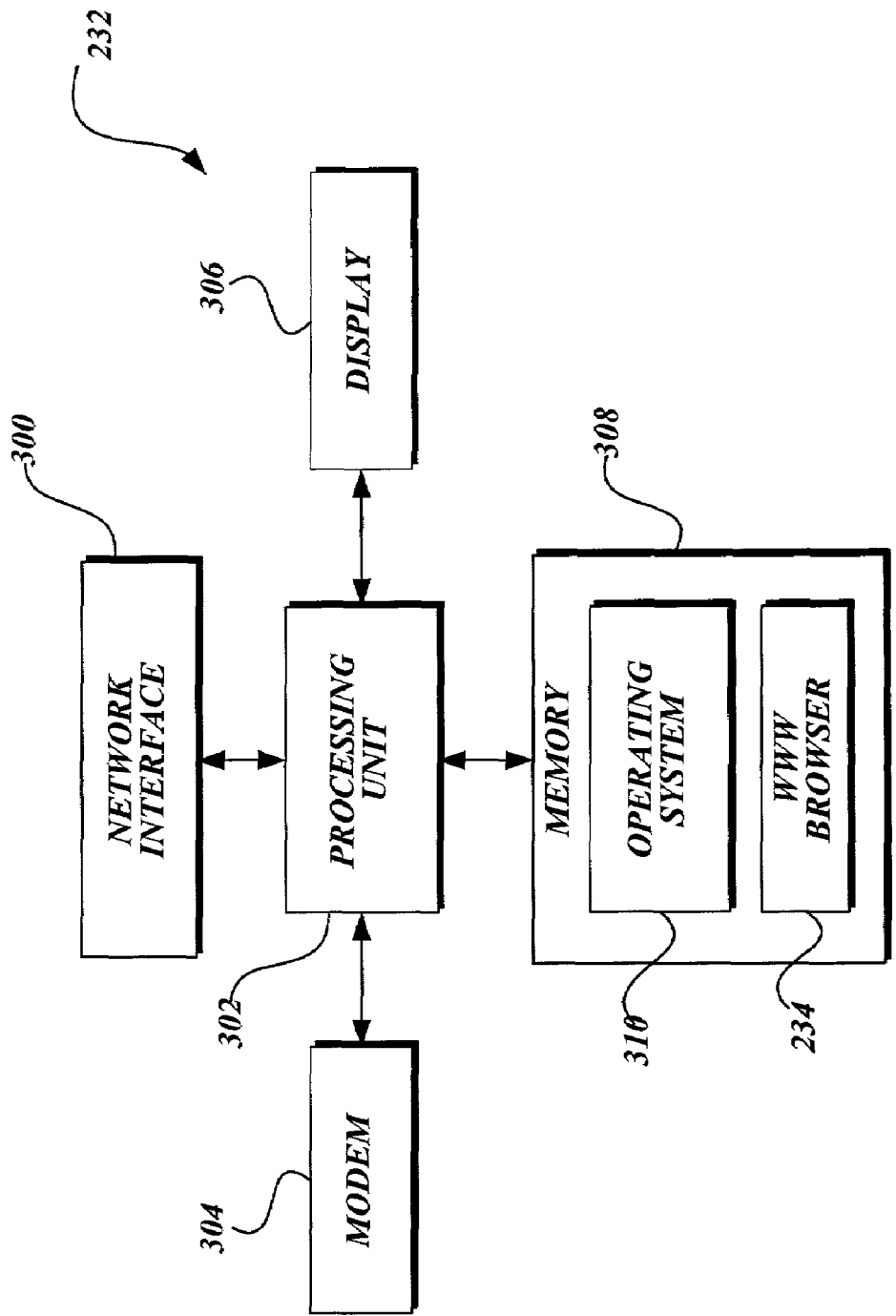
FIG. 3 is a block diagram depicting an illustrative architecture for a client computing device formed in accordance with the present invention.

FIG. 3 is a block diagram depicting an illustrative architecture for a client computing device 232 (FIG. 2) utilized to interact with the travel management system 230 in accordance with the present invention. Those of ordinary skill in the art will appreciate that the client-computing device 232 includes many more components then those shown in FIG. 3. However, it is not necessary that all of these generally conventional components well known to those of ordinary skill in the relevant art be shown in order to disclose an enabling embodiment for practicing the present invention.

As shown in FIG. 3, the client computing device 232 includes a network interface 300 for connecting directly to a LAN or a WAN, or for connecting remotely to a LAN or WAN. Those of ordinary skill in the art will appreciate that the network interface 300 includes the necessary circuitry for such a connection, and is also constructed for use with various communication protocols, such as the TCP/IP protocol, the Internet Inter-ORB Protocol ("IIOP"), and the like. The network interface 300 may utilize the communication protocol of the particular network configuration of the LAN or WAN it is connecting to, and a particular type of coupling medium. The client computing device 232 may also be equipped with a modem 304 for connecting to the Internet through a Point-to-Point Protocol ("PPP") connection or a Serial Line Internet Protocol ("SLIP") connection as known to those skilled in the art. The modem 304 may utilize a telephone link, cable link, wireless link, Digital Subscriber Line or other types of communication links known in the art.

The client-computing device 232 also includes a processing unit 302, a display 348, and a memory 308. The memory 308 generally comprises a random access memory ("RAM"), a read-only memory ("ROM") and a permanent mass storage device, such as a disk drive. The memory 308 stores an operating system 310 for controlling the operation of the client-computing device 232. In an actual embodiment of the present invention, the operating system 310 provides a graphical operating environment, such as Microsoft Corporation's WINDOWS® graphical operating system in which activated application programs are represented as one or more graphical application windows with a display visible to the user. The memory 308 also includes a web browser 234, such as Netscape's NAVIGATOR® or Microsoft's Internet Explorer browsers, for accessing the travel management system 230 via the World Wide Web. It will be appreciated that these components may be stored on a computer-readable medium and loaded into the memory 308 of the client-computing device 232 using a drive mechanism associated with the computer-readable medium, such as a floppy, CD-ROM, DVD-ROM drive, or network interface 300. The memory 308, network interface 300, display 348, and modem 304 are all connected to the processing 344 unit via one or more buses. As would be generally understood, other peripherals may also be connected to the processing unit in a similar manner.

Figure 4:
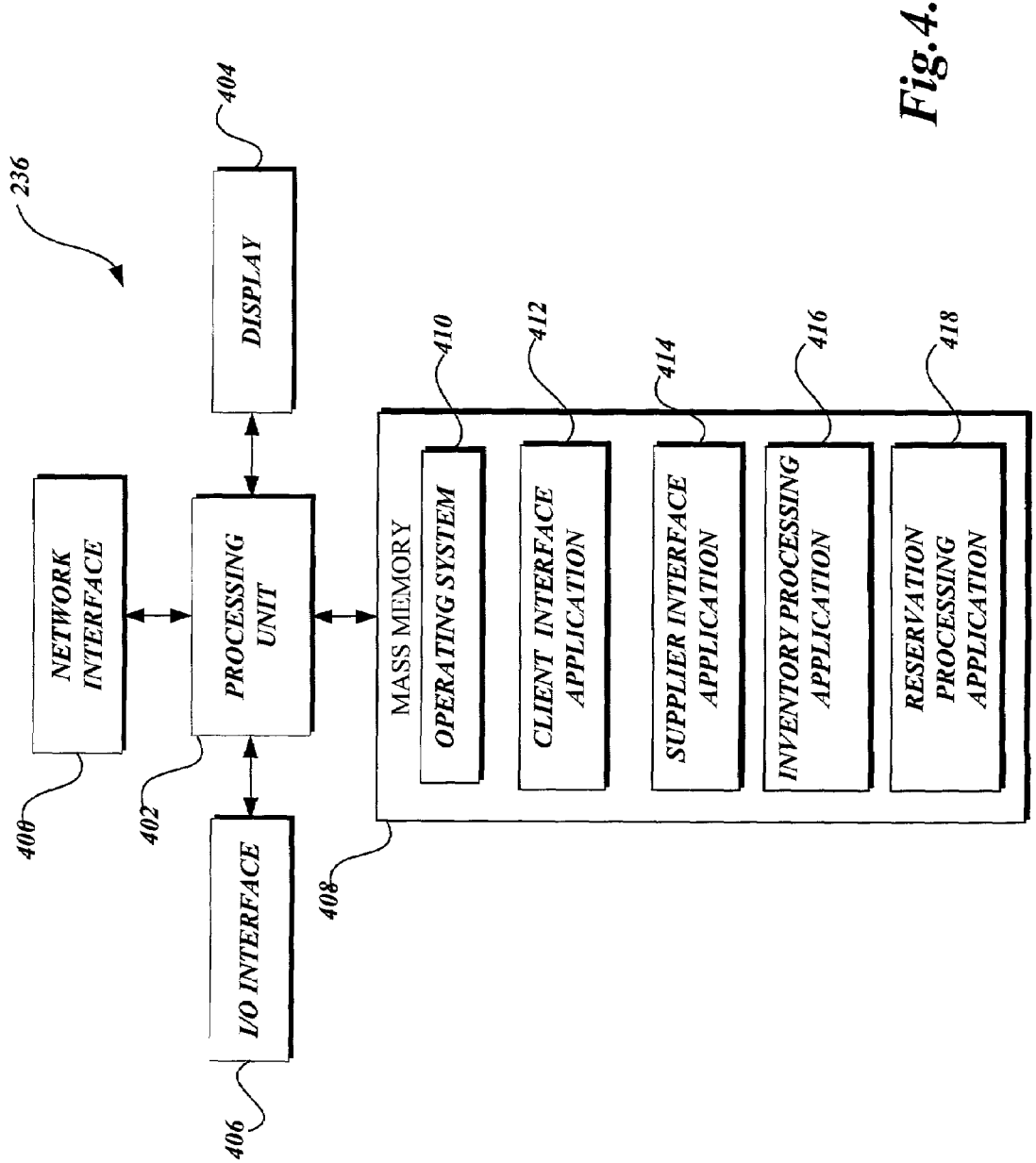
FIG. 4 is a block diagram depicting an illustrative architecture for a travel server formed in accordance with the present invention.

FIG. 4 is a block diagram depicting an illustrative architecture of a travel server 236 (FIG. 2) utilized to interact with the travel management system 230 in accordance with the present invention. Those of ordinary skill in the art will appreciate that the travel server 236 includes many more components than those shown in FIG. 4. However, it is not necessary that all of these generally conventional components be shown in order to disclose an illustrative embodiment for practicing the present invention. As shown in FIG. 4, the travel server 236 is connected to the Internet 20 via a network interface 400. Those of ordinary skill in the art will appreciate that the network interface 400 includes the necessary circuitry for connecting the travel server 236 to the Internet 20, and is constructed for use with the TCP/IP protocol, or other protocols, such as IIOP.

The travel server 236 also includes a processing unit 402, an optional display 404, an input/output ("I/O") interface 406, and a mass memory 408, all connected via a communication bus, or other communication device. The mass memory 408 generally comprises a RAM, ROM, and a permanent mass storage device, such as a hard disk drive, tape drive, optical drive, floppy disk drive, or combination thereof. The mass memory 408 stores an operating system 410 for controlling the operation of the travel server 236. It will be appreciated that this component may comprise a general-purpose server operating system as is known to those of ordinary skill in the art, such as UNIX, LINUX™, or Microsoft WINDOWS NT®.

The mass memory 408 also stores the program code and data for interfacing with one or more client computing devices 232, for interfacing with one or more Internet suppliers 240, for processing various inventory management tasks, and for processing various reservation management tasks. More specifically, the mass memory 408 stores a client interface application 412 for communicating with one or more client computing devices 232 via one or more World Wide Web pages. The client interface application 412 comprises computer-executable instructions which, when executed by the travel server 236 establishes a communication channel with one or more client computing devices 232. The operation of the client interface application 412 will be described in greater detail as described below. The mass memory 408 also stores a supplier interface application 414 for communicating with one or more suppliers. The supplier interface application 414 comprises computer-executable instructions which, when executed by the travel server 236, establishes a communication channel with one or more suppliers 240. The supplier interface application 414 will be explained in greater detail below.

Mass memory 408 also stores an inventory processing application 416 for processing inventory and a reservation processing application 418 for processing reservations. Both the inventory processing application 416 and reservation application 418 comprise computer-executable instructions that, when executed by the travel server 236, facilitate the management of inventory and reservation data. One skilled in the relevant art will appreciate that these components may be stored on a computer-readable medium and loaded into the mass memory 408 of the travel server 236 using a drive mechanism associated with the computer-readable medium, such as a floppy, CD-ROM, DVD-ROM drive, or the network interface 400.

In accordance with an inventory management aspect of the present invention, the travel server 236 of the travel management system 230 is utilized to manage available inventory item queries and inventory item action requests from client computers 232 and suppliers 240. In accordance with this aspect, the travel server 236 acquires rights to various inventory items from one or more suppliers 240. For example, if the inventory item is a tangible good, a travel server service may physically obtain possession of the item to be offered for sale. If the inventory item is not a tangible good, the travel server service may only acquire an acknowledgment from the supplier 240 of the travel server's rights to sell the good/service.

Regardless of whether the inventory item is tangible, after acquiring the various inventory items from the various suppliers 240, the travel server 236 stores data describing the inventory item and its availability to a consumer, referred generally as inventory item data. Utilizing the inventory item data, the travel server 236 can accept client computer queries for available inventory items. Additionally, the travel server 236 can also accept supplier communications regarding a variety of tasks for managing the supplier's inventory items maintained by the travel server 236.

Figure 5:
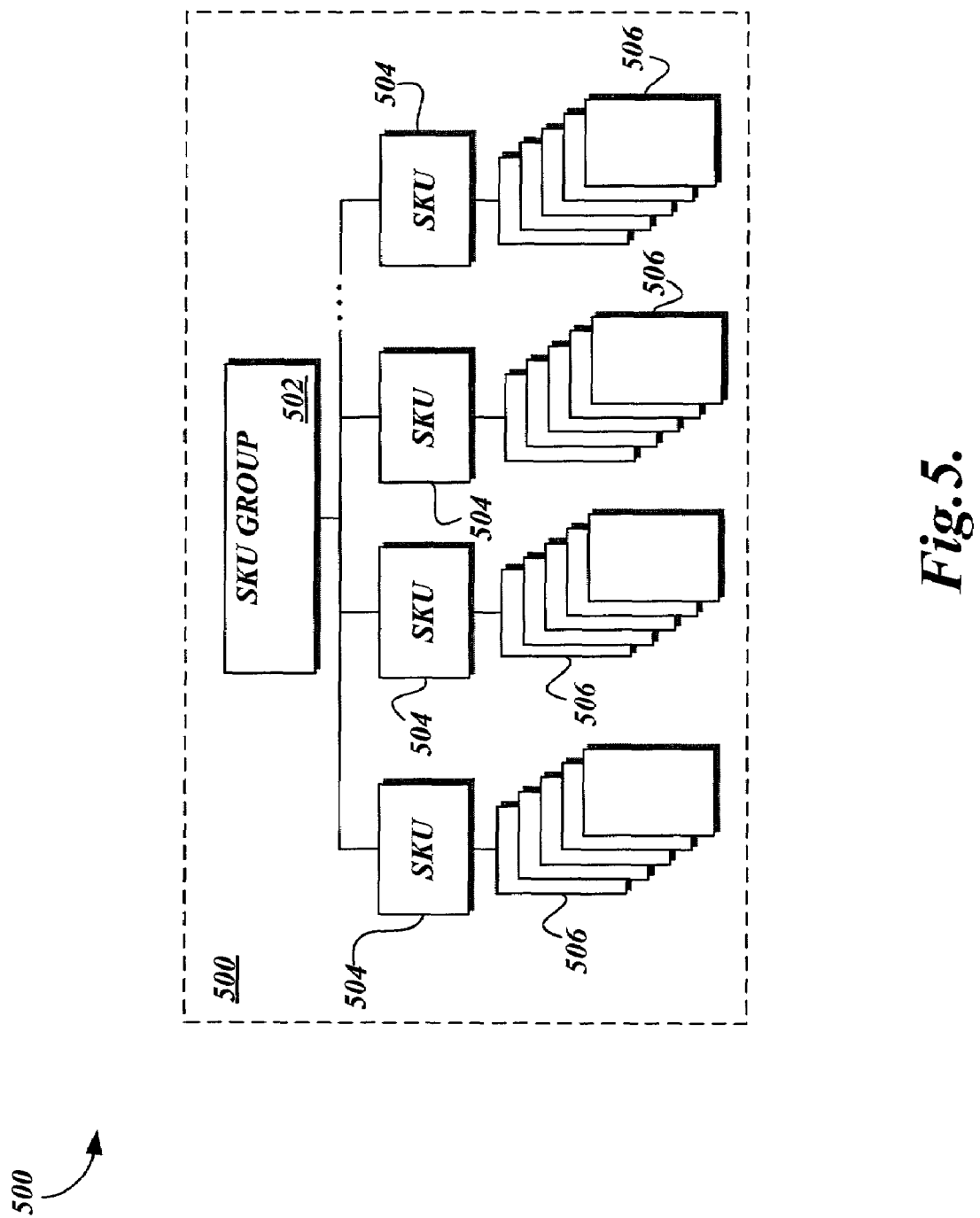
FIG. 5 is a block diagram of a three detail level inventory item data relationship formed in accordance with the present invention.

In accordance with the present invention, to facilitate inventory item data management, the travel server 236 utilizes an inventory item data relationship to process the inventory item data in a variety of manners. More specifically, in one embodiment of the present invention, the travel server 236 utilizes a data relationship establishing three distinct levels of data description for managing inventory items. FIG. 5 is a block diagram of a three detail level inventory item relationship 500 utilized by the travel server 236 to manage inventory items in accordance with the present invention. The three levels of detail form a hierarchical relationship such that each level includes data corresponding to various aspects of an inventory item managed by the travel server 236.

Generally described, a first level of detail contains the broadest characteristic data associated with an inventory item. The first level of detail can be common to a number of inventory items. The second level of detail is related to the first level of detail and contains more specific data associated with the inventory item. The second level detail data is not as broad as the first level, but it can also be common to a number of inventory items. The third level of detail is related to the first and second levels of detail and provides even more specific data associated with the inventory item. The third level of detail includes data that is limited to a single inventory item.

As illustrated in FIG. 5, the first level of detail utilized to describe an inventory item is a stock-keeping unit ("SKU") group 502 record. Each SKU group 502 record includes the most broad description data associated with an inventory item. The SKU group 502 data can be common to a variety inventory items. However, a SKU group 502 record is not required for each type of inventory item. A second level of detail utilized to define an inventory item is a SKU 504 record. Each SKU 504 record corresponds to a SKU group 502 and defines more specific data related to an inventory item. More specifically, each SKU 504 record corresponds to an identifiable product or service that can be sold to a consumer. Accordingly, the SKU 504 record contains the primary level of detail. Similar to SKU group 502, the SKU 504 data may be associated with more than one inventory item. A third level of detail utilized to define an inventory item is a SKU inventory 506 record. Each SKU inventory 506 record corresponds to both a single SKU group 506 and a single SKU 504 record and defines even more specific data related to an inventory item. However, unlike the SKU group 502 and SKU 504 records, the SKU inventory 506 data is associated with a single inventory item. More specifically, the SKU inventory 506 record corresponds to a specific instance of the SKU 504 record. One skilled in the relevant art will appreciate that allocation of details between the SKU group 502, SKU 504 and SKU inventory 506 records may be modified.

In an illustrative example applying the definitions of the SKU inventory item information to a hotel room inventory item, assume that an inventory item is a block of hotel rooms available for sale on a specified date. In accordance with the present invention, the travel server 236 would store details relating to the instance of the inventory item, namely, the hotel room on the specified date, in accordance with the inventory item data relationship 500. More specifically, the travel server 236 could create a SKU group 502 corresponding to a first level of detail, such as the hotel name. The hotel SKU group 502 record could include the most broad data unique to all inventory items relating to the hotel, such as general hotel service fees, hotel-wide limitations of use, and the like. Additionally, the SKU group 502 record information could also include date-based information that would allow the travel server 236 to determine specific charges, taxes, service fees that may be dependent on the particular date of use.

The travel server 236 could then create one or more SKU 504 records associated with the SKU group 502 record and corresponding to a second level of detail for the inventory item. For example, the travel server 236 could create a SKU 504 record for each type of room in the hotel (SKU group 502), such as double rooms, king size rooms, and penthouse suites. The travel server 236 would include all room specific data in each SKU 504 record, such as base prices for each room type, surcharge unique to all penthouse suites, room dimensions, room utilization records, etc.

Continuing, the travel server 236 could then create a SKU inventory record 506 associated with the SKU group 502 and SKU 504 records and corresponding to a third level of detail related to the inventory item. Each SKU inventory 506 record would include data describing specific characteristics of the inventory item, namely a hotel room(s) for sale. The information can include the cost of the room from the supplier 240, the price of the room charged to the consumer, limitations of use. Additionally, the information can also include supplier-based limitations, such as a maximum price that may be charged to a consumer, a date by which the reservation must be made, etc. With reference to the previous example, if a supplier 240 allotted twenty double rooms available on Jul. 28, 2001, the travel server 236 could create a SKU inventory 506 record, associated with both the hotel SKU group 502 and a double room SKU 504, and including data defining the Jul. 28, 2001 existence date and the 20 room availability. In a similar manner, if the supplier 240 were to allot the travel server 236 the same block of rooms for the next night, namely, Jul. 29, 2001, a new SKU inventory record 506 would be generated having data defining a Jul. 29, 2001 existence date and a 20 rooms availability. In this example, both SKU inventory records would be linked to the same SKU group 502 record and SKU 504 record.

In another illustrative example applying the definitions of the SKU inventory item information to a music compilation by an artist, assume that the inventory items are a number of albums, cassette tapes, compact discs ("CD"), and digital video disks ("DVD") related to a specific artist to be sold by the travel server 236, or any server configured to sell music related goods. To store the inventory item data, the travel server 236 could create a SKU group 502 record corresponding to a first level of detail, such as a music supplier or a particular music label. The travel server 236 could then create a number of SKU 504 records corresponding to a second level of detail. In the illustrative example, the travel server 236 could create a SKU 504 record for each type of product offered for sale. For example, the travel server 236 could create an album SKU record for each distinct album provided by the supplier, a cassette tape SKU record for each distinct cassette tape offered by the supplier, a CD SKU record for each distinct CD offered by the supplier, and a DVD SKU record for each distinct DVD offered by the supplier. Finally, the travel server 236 could create SKU inventory 506 records for each instance of the SKU 504 records. For example, if the supplier had two allotments of the same distinct CD for sale, the travel server 236 could create two SKU inventory 506 records related to the CD SKU 504 record and corresponding to each allotment by the supplier. Each of these SKU inventory 506 records would include the number of CDs supplied to the travel server 236 by each allotment. One skilled in the relevant art will appreciate that the inventory item data relationship 500 may also be applied to a variety of other inventory types, including but not limited to, airline services, cruise services, tickets for events, rental property, and the like. Additionally, one skilled in the art will appreciate that some inventory items may not utilize all three levels of detail, or that additional or different levels of detail may be utilized in accordance with the present invention.

Figure 6:
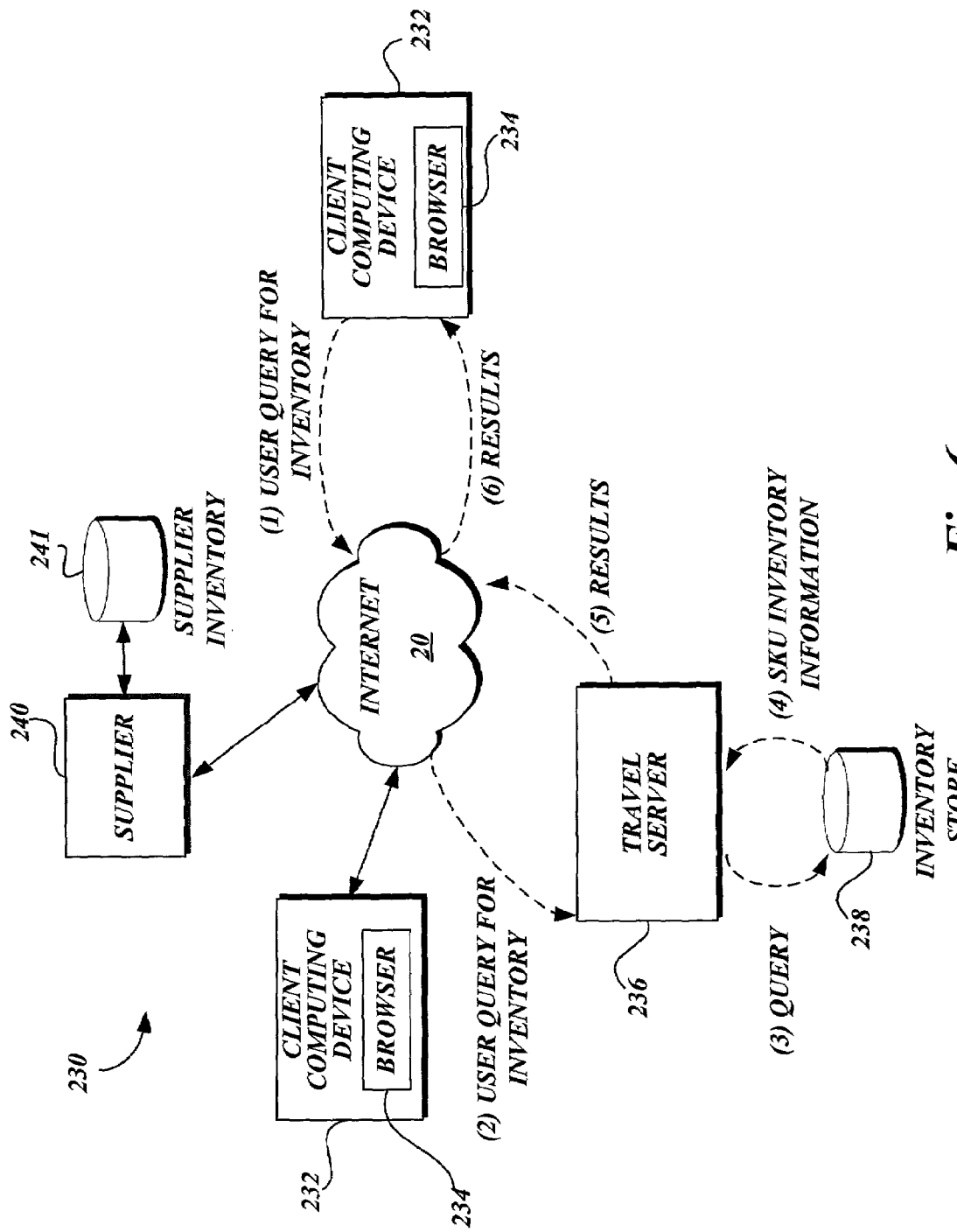
FIG. 6 is a block diagram of the travel management system of FIG. 2 illustrating a client computing device inventory query made in accordance with the present invention.

As previously described, in accordance with an aspect of the present invention, the travel server 236 may be utilized to perform a variety of inventory management tasks. FIGS. 6 and 10-12 are block diagrams of the travel management system 230 of FIG. 2 illustrating various inventory management tasks that may be performed by the travel management system in accordance with the present invention. Referring to FIG. 6, in accordance with an aspect of the present invention, the travel management system 230 may be utilized to accept client computing device 232 queries for available inventory. In an illustrative embodiment of the present invention, a consumer may utilize a Web browser 234 on the client computing device 232 to access a Web site provided by the travel server 236. For example, the consumer may be interested in obtaining information about available airline flights. Accordingly, the consumer need not make a reservation request, but may limit the communication to an inquiry regarding availability, price, number of options, etc.

As illustrated in FIG. 6, a client computing device 232 issues a user query for inventory items. The user query for inventory is transmitted via a communication network, such as Internet 20, and is received by the travel server 236. The travel server 236 issues a query to the inventory store 238 which returns inventory item data stored according to the inventory item data relationship 500 and matching the query criteria. The travel server 236, via the communication channel, transmits the results of the query to the client computing device 232.

Figure 7:
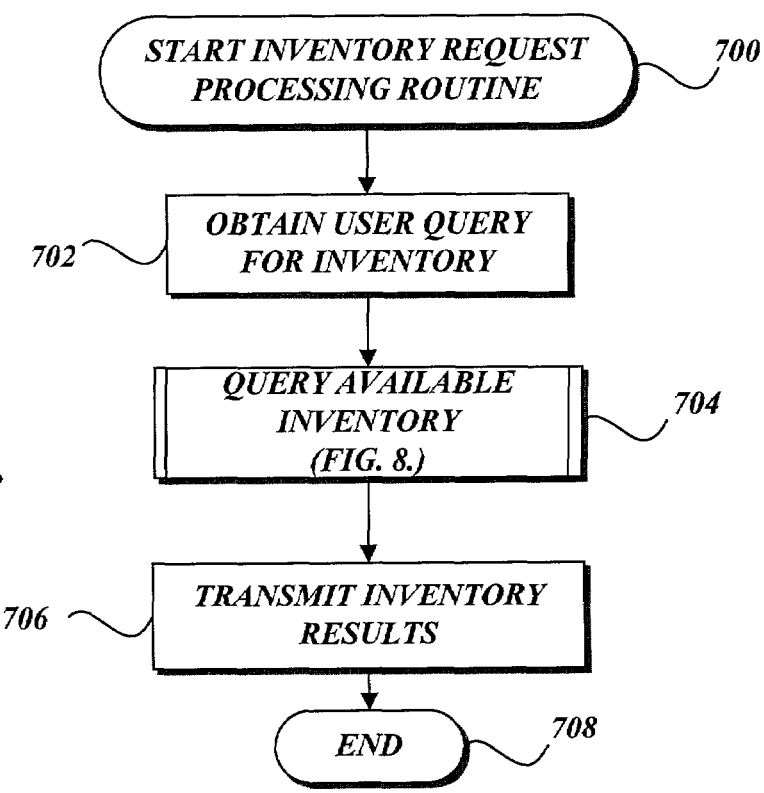
FIG. 7 is a flow diagram illustrating an inventory request processing routine implemented by an inventory processing application in accordance with the present invention.

FIG. 7 is a flow diagram illustrative of an inventory request processing routine 700 implemented by the travel server 236 to process the query for inventory items depicted in FIG. 6 in accordance with the present invention. At block 702, the client interface application 412 of the travel server 236 obtains the user query for available inventory items. In one embodiment of the present invention, the user query for inventory includes a set of criteria that may be utilized to identify corresponding inventory item data stored within the inventory store 238. The set of criteria can include a date or range of dates for use if the inventory is available on multiple dates. The set of query criteria can also include a variety of inventory specific identifiers such as a selection of a hotel, an airline, a cruise and any combination thereof. The set of query criteria can also include the selection of preferences for specific type of inventory items. For example, the set of criteria can include a selection of a type of seat on an airline flight (e.g., window, aisle, first class), a hotel room type, a cabin type, smoking preferences, special meal requests, amenities, proximity to additional amenities, and the like. The set of criteria can further include the identification of a specific product, such as a title of a book, a product code, an order number, etc. Additionally, the set of criteria may include one or more prestored user preferences that will facilitate the selection of matching inventory items from the inventory store 238. For example, a consumer may configure a client computing device 232 to issue an inventory item query for a specific airline flight at the beginning of every month.

Still further, in one embodiment of the present invention, the travel server 236 may provide the client computing device 232 with one or more graphical user interface ("GUI") that allow a consumer to designate the selection of inventory items selection criteria by manipulation of graphical objects. For example, the travel server 236 may provide a calendar graphical object that allows a consumer to select a date or range of dates of interest within a month time period.

Figure 8:
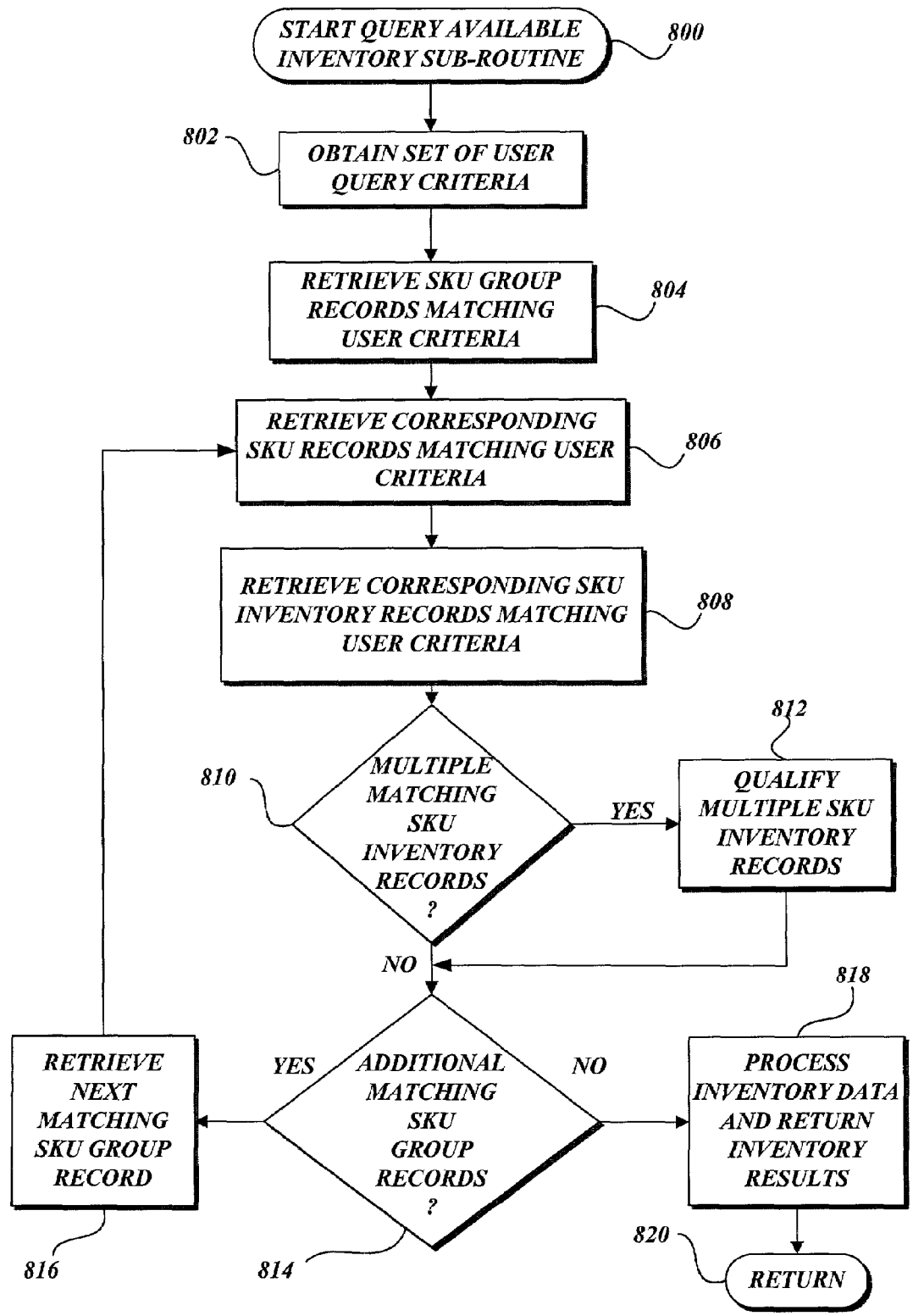
FIG. 8 is a flow diagram illustrating a query available inventory subroutine implemented by an inventory processing application in accordance with the present invention.

At block 704, the inventory processing application 416 of the travel server 236 queries for available inventory from the inventory store 238. FIG. 8 is a flow diagram of a query available inventory sub-routine 800 implemented by the inventory processing application 416 in accordance with the present invention. At block 802, the inventory processing application 416 obtains the set of user specified criteria from the client interface application 412. In one embodiment of the present invention, the inventory processing application 416 may also process the inputted criteria to generate additional selection criteria. For example, if the client computing device 232 inputs a selected date or date range, the inventory processing application 416 may also generate additional range of dates or combinations of dates to be searched.

At block 804, the inventory processing application 416 retrieves any SKU group 502 records matching the set of criteria. At block 806, the inventory processing application 416 retrieves any SKU 504 records corresponding to the SKU group 502 records and matching the set of user criteria. At block 808, the inventory processing application 416 retrieves any SKU inventory 506 records corresponding to the SKU group 502 and the SKU 504 records and matching the set of user query.

At decision block 810, a test is conducted to determine whether there are multiple matching SKU inventory 506 records. In accordance with one embodiment of the present invention, multiple matching SKU inventory 506 records may exist for a specific SKU 504. For example, based on a previous allotment from a supplier 240, the inventory store 238 may have a first SKU inventory 506 record for a hotel room type (e.g., double room) having a first cost and a second SKU inventory 506 record for the same hotel room type at a second cost. Accordingly, the inventory processing application 416 may be required to determine which SKU inventory 506 record best matches the submitted criteria. If there are multiple SKU inventory 506 records, the inventory processing application 416 qualifies the multiple SKU inventory 506 records at block 812. In one embodiment of the present invention, qualification of the SKU inventory 506 records includes the selection of an applicable SKU inventory 506 record. For example, if a SKU inventory 506 record corresponds to an inventory item has a consumer limitation of use (e.g., must be sold in conjunction with a particular airline carrier or as part of a package) and the request criteria does not satisfy the limitation of use, the inventory processing application 416 would not select SKU inventory 506 record. Similarly, if a matching SKU inventory 506 record includes a supplier limitation of use (e.g., the inventory items from a first allotment must be sold before inventory items in a second allotment), the inventory processing application 416 would not select the SKU inventory 506 record corresponding to the second allotment of inventory items. However, the qualification of the SKU inventory 506 records can also include the selection of otherwise not restricted SKU inventory 506 records, without having to select a single matching SKU inventory 506 record.

Upon completion of block 812, or if there are not multiple matching SKU inventory 506 records at decision block 810, at decision block 814, a test is conducted to determine whether there are any additional matching SKU group 502 records. If there are additional SKU group 502 records, at block 816, the inventory processing application 416 retrieves the next matching SKU group 502 record and the sub-routine 800 returns to block 806. Blocks 806-816 can then be repeated until all the matching SKU group 502 records identified at block 804 are processed. Moreover, although the retrieval and qualification processes have been illustrated as separate transactions, one skilled in the relevant art will appreciate that all the SKU group 502, SKU 504, and SKU inventory 506 records may be retrieved and qualified in a single transaction.

If there are no additional matching SKU group 502 records, the inventory processing application 416 processes and returns the SKU information data identified in blocks 804-812, at block 818. In one embodiment of the present invention, the inventory processing application 416 may be processed to generate a total price for each selected inventory item corresponding to the SKU information. In another embodiment of the present invention, the processing can include a determination whether the inventory item(s) corresponding to the SKU information is available. Still further, the inventory processing application 416 may utilize one or more processing methods for generating an ordered list of inventory items corresponding to the matching SKU information sorted by price to the consumer, or other factors. For example, if the request criteria includes preference criteria (e.g., such as for an airline corresponding to a user's frequent flyer program), the inventory processing application 416 could select to display a SKU inventory 506 record matching that characteristic as the first item display to the user. An example of a processing method and system for establishing an ordered list based on a consumer price is disclosed in U.S. patent application Ser. No. 09/825,451, entitled OPTIMIZED SYSTEM AND METHOD FOR FINDING BEST FARES, filed Apr. 4, 2001, incorporated by reference herein. However, one skilled in the relevant are will appreciate that alternative or additional matching inventory data processing methods may be practiced with the present invention. Additionally, in accordance with the present invention, the inventory processing application 416 may also generate various graphic and text screen display for display by the client computing device 232. For example, the travel server 236 could populate a calendar GUI with the date ranges of available inventory items. At block 820, the sub-routine 800 returns to routine 700.

Returning to FIG. 7, at block 706, the client interface application 412 obtains the results from the inventory processing application 416 and transmits the processed inventory data results (e.g., the SKU information) to the client computer 232. At block 708, the routine 700 terminates.

Figure 9:
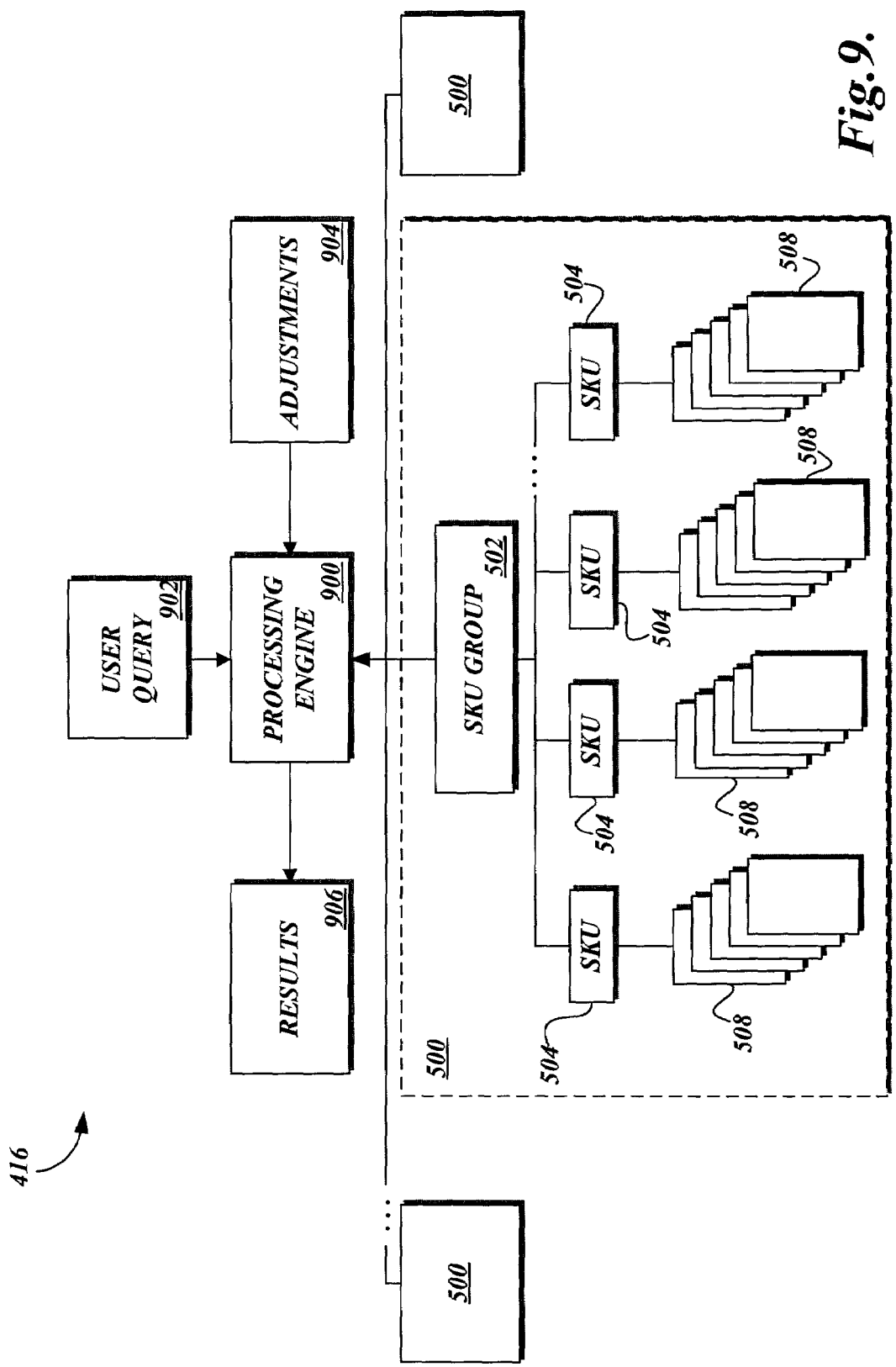
FIG. 9 is a block diagram illustrating a data relationship utilized by an inventory processing application in accordance with the present invention.

FIG. 9 is a block diagram illustrating the data relationships utilized by the inventory processing application 416 of the travel server 236 to process an available inventory query issued by a client computing device 232. In one embodiment of the present invention, the inventory processing application 416 may function as a processing engine 900 to obtain and process various blocks of data. As illustrated in FIG. 9, the processing engine 900 obtains a block of data stored according to the inventory item data relationship 500 and relating to a user query 902. Based on the set of criteria associated with the user query 902 and a processing method, such as routines 700 and 800 illustrated in FIGS. 7 and 8 and described above, the processing engine 900 obtains one or more blocks of inventory item data 500. In addition to the user query 902, and the inventory item data 500, the processing engine 900 can also obtain a block of data 904 related to one or more external adjustments not directly related to the specific inventory item data 500. For example, the adjustment data block 904 can include data related to user specific discounts, medium specific discounts (e.g., use of the Internet to process requests), non-inventory item related service fees, tax rates, advanced purchase discounts, customer history price adjustments, length of stay price adjustments, special pricing codes, and the like. Utilizing the user query data 902 the inventory item data 500 and the adjustment data 904 data blocks, the processing engine 900 then processes the inventory item data to generate a set of processed results 906 as explained above with respect to block 818 (FIG. 8). The process resulted can then be transmitted by the inventory processing application 416 to the client interface application 412 for transmission to a client computing device 232. One skilled in the relevant art will appreciate that the data diagram of FIG. 9 is done for illustrative purposes and that alternatives may be implemented within the scope of the present invention.

Figure 10:
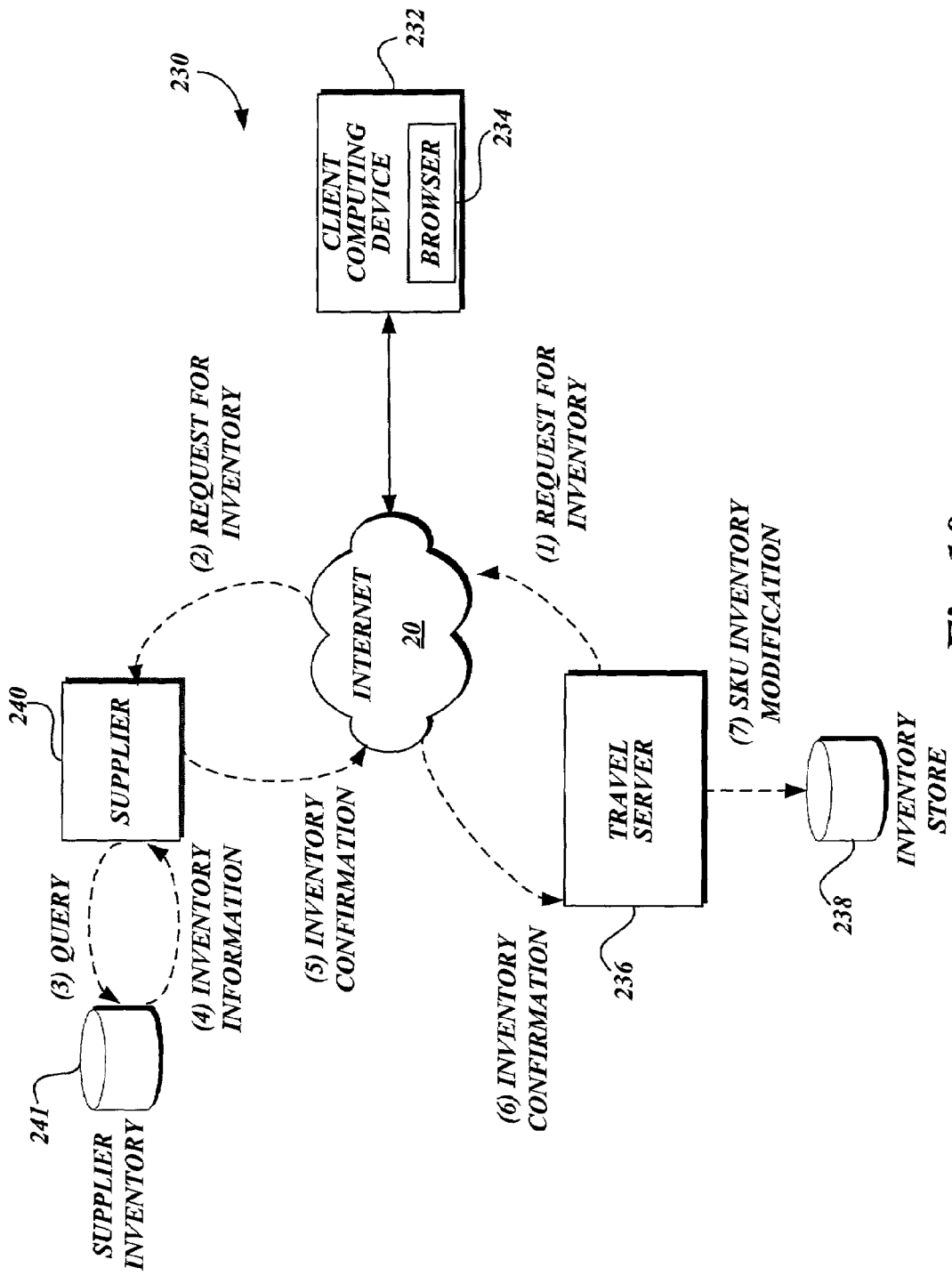
FIG. 10 is a block diagram of the travel management system of FIG. 2 illustrating a travel server request for inventory from a supplier made in accordance with the present invention.

With reference to another inventory management task, FIG. 10 is a block diagram of the travel management system 230 of FIG. 2 illustrating a request for new inventory initiated by the travel server 236 in accordance with the present invention. In this embodiment, the travel server 236 generates a request for inventory via a communication network, such as Internet 20, to a supplier 240. The supplier 240 processes the travel server 236 request by querying the supplier inventory store 241. The results of the supplier inventory query are returned to the supplier 240 and then transmitted to the travel server 236 via the communication network 20. The travel server 236 then modifies any corresponding inventory items according to the response received from the supplier 240. In an actual embodiment of the present invention, users associated with both the travel server 236 and the supplier 240 may initiate actions via Web-based controls. Moreover, the travel server 236 computing system does not need to directly integrate with the supplier 240 computing system, such as by having access to the supplier database 41 or any other supplier application program. Instead, the interaction between the parties may only entail the exchange of data communications.

Figure 11:
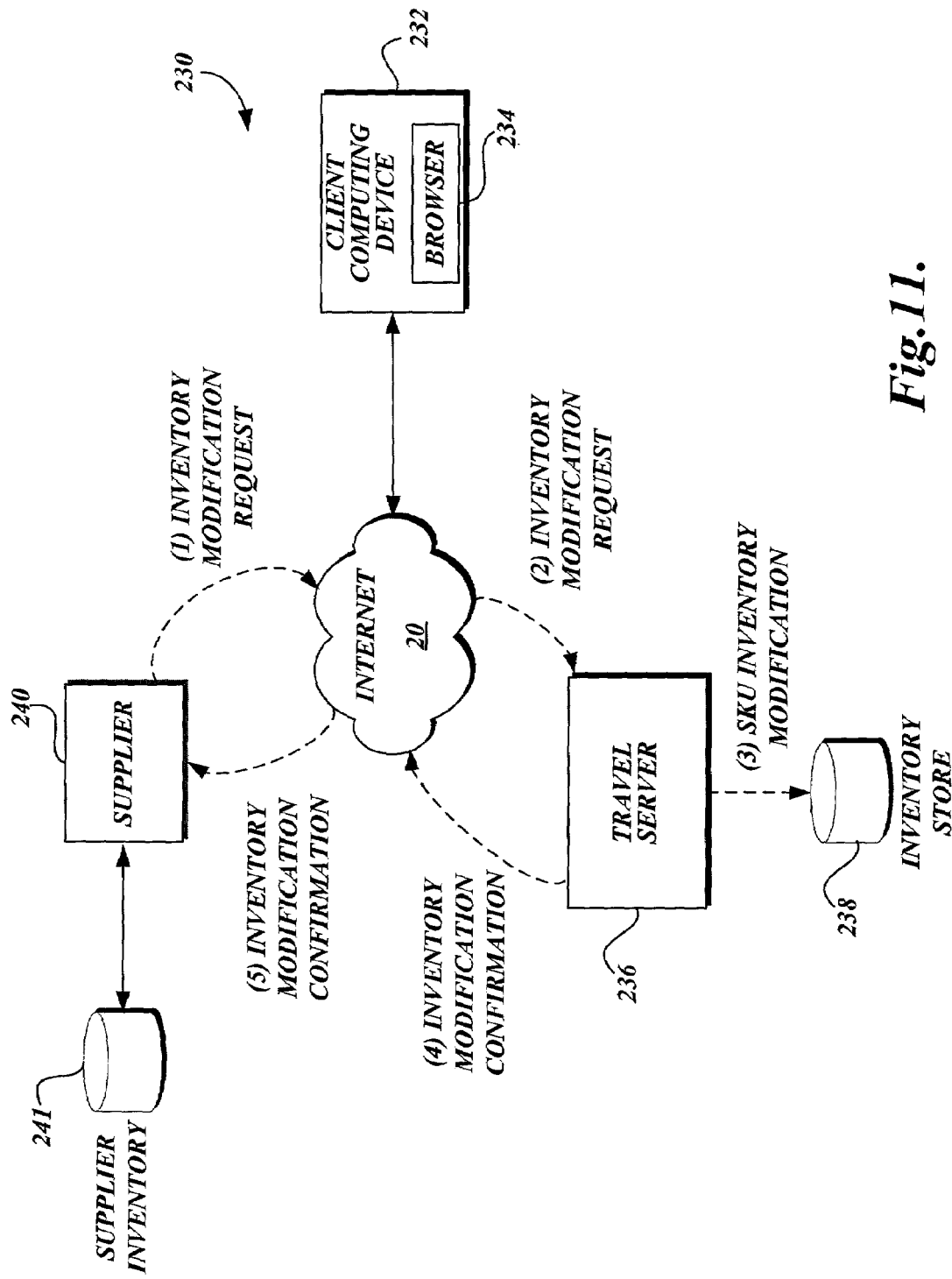
FIG. 11 is a block diagram of the travel management system of FIG. 2 illustrating a supplier inventory action request made in accordance with the present invention.

FIG. 11 is a block diagram of the travel management system 230 of FIG. 2 illustrating a supplier initiated inventory modification request. Similar to the block diagram of FIG. 10, this embodiment relates to the modification of the inventory data stored by the travel server 236 in the inventory store 238. As illustrated in FIG. 11, a supplier 240 initiates an inventory modification request via a communication network, such as Internet 20. In one embodiment of the present invention, a supplier agent may generate the inventory modification request by a Web page interface provider by either a supplier 240 computing system or the travel server 236. The travel server 236 receives the inventory modification request. In one embodiment, the travel server 236 is not required to accept the modification request transmitted by the supplier. However, assuming that at least a portion of the modification request is acceptable to the travel server 236, the travel server 236 processes the inventory modification request and modifies the inventory store 238 according to the information contained within the inventory modification request. An inventory modification confirmation is then sent from the travel server 236, via the communication network 20, to the supplier 240. One skilled in the relevant art will understand that in some embodiments, the travel server 236 may be required to accept all modification requests.

Figure 12:
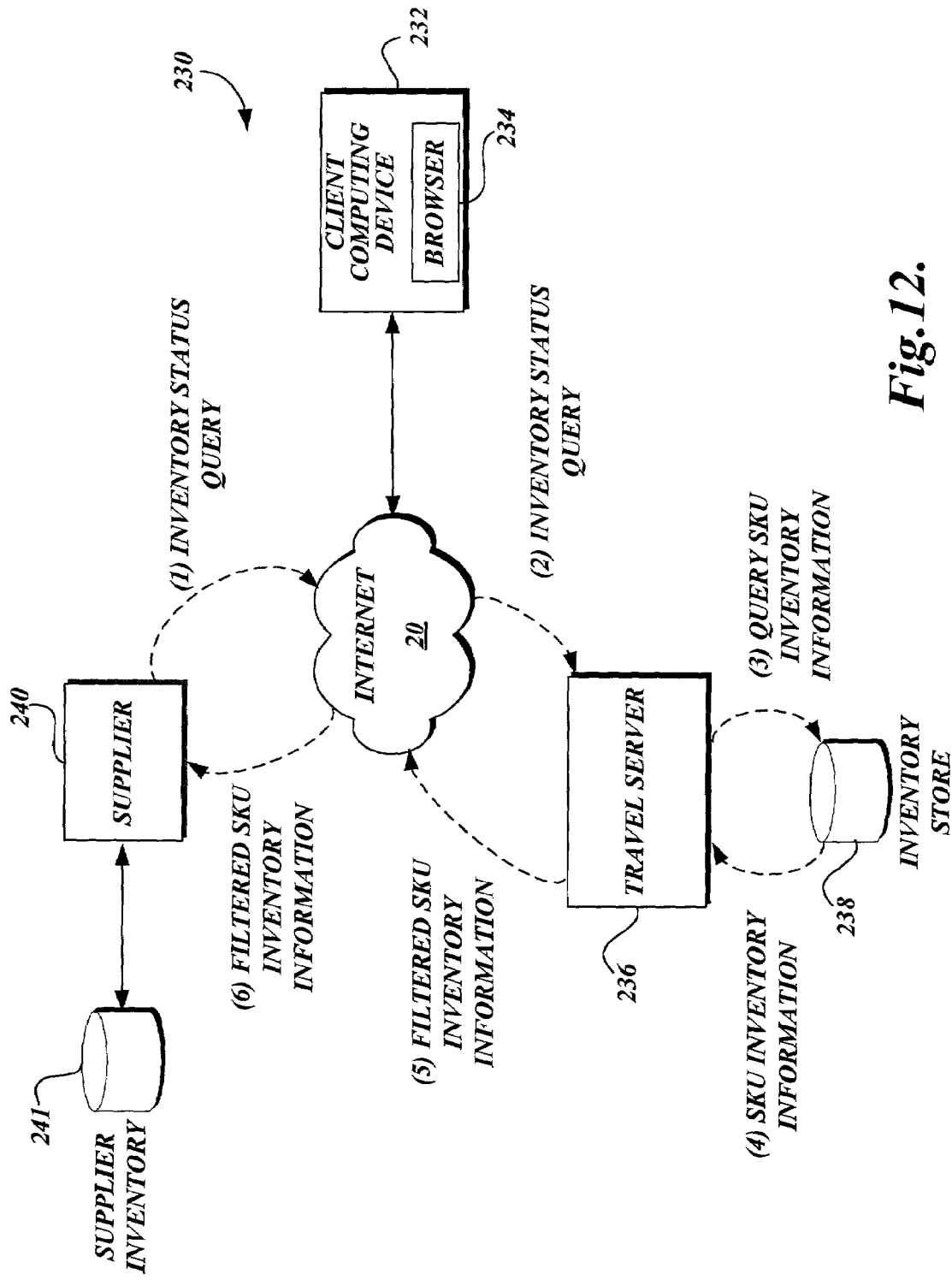
FIG. 12 is a block diagram of the travel management system of FIG. 2 illustrating a supplier inventory action request made in accordance with the present invention.

FIG. 12 is a block diagram of the travel management system 230 of FIG. 2 illustrating a supplier request for inventory status. As illustrated in FIG. 12, a supplier 240 initiates an inventory status query via a communication network, such as Internet 20. The travel server 236 receives the inventory status query and queries the inventory store 238. The inventory store 238 returns inventory item data matching the supplier query. As will be explained in greater detail below, the travel server 236 has the option of filtering out a portion of the inventory item data received from the inventory store 238. The travel server 236 then transmits the inventory item data to the supplier 240 via the communication network 20.

Figure 13:
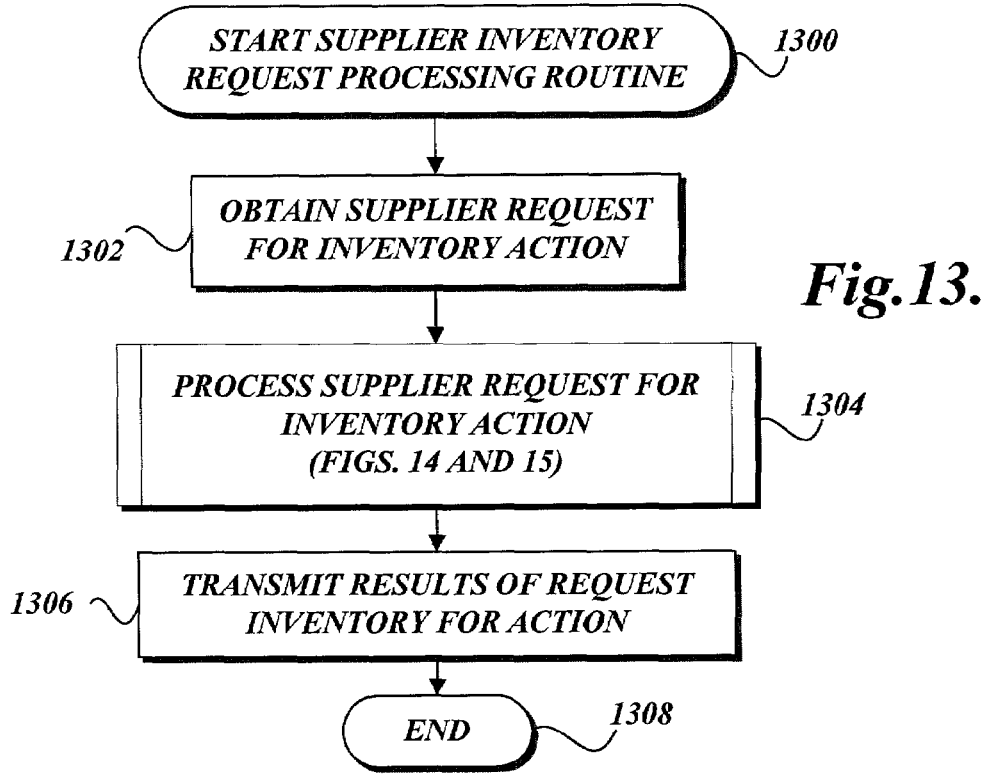
FIG. 13 is a flow diagram illustrating a supplier inventory action request processing routine implemented by an inventory processing application in accordance with the present invention.

FIG. 13 is a flow diagram illustrative of a supplier inventory request processing routine 1300 utilized by the travel server 236 to facilitate various supplier 240 action requests, such as the supplier inventory actions illustrated in FIGS. 10, 11, and 12. At block 1302, the supplier interface application 414 of the travel server 236 obtains a supplier request for an inventory action. At block 1304, the inventory processing application 416 processes supplier requests for inventory action. In one embodiment of the present invention, the inventory processing application 416 may implement one or more sub-routines related to various supplier requests for inventory action.

Figure 14:
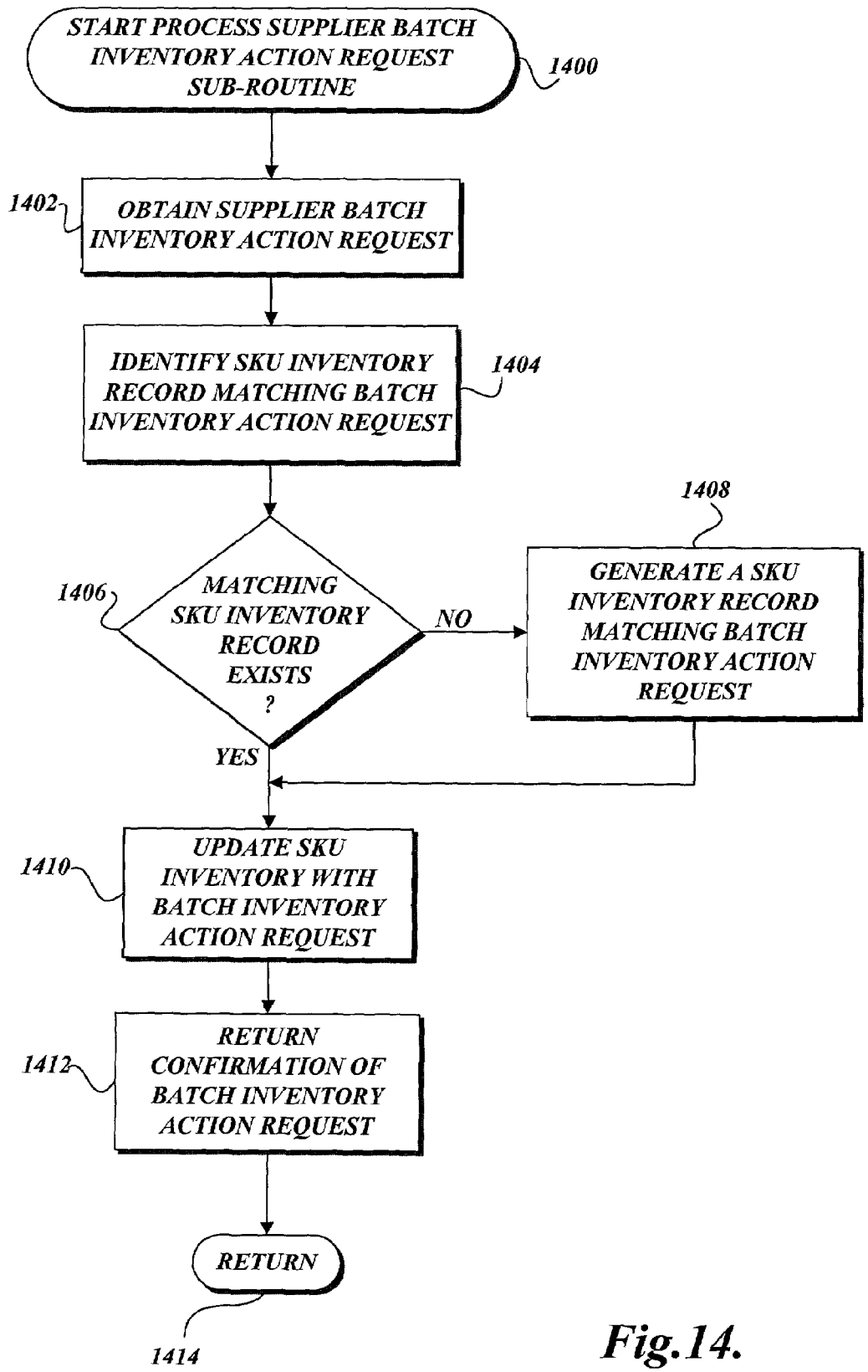
FIG. 14 is a flow diagram illustrating a supplier batch inventory action request sub-routine implemented by an inventory processing application in accordance with the present invention.

For example, FIG. 14 is a flow diagram illustrative of a process supplier batch inventory action request subroutine 1400 implemented by the inventory processing application 416 of the travel server 236 in accordance with the present invention. At block 1402, the inventory processing application 416 obtains the supplier batch inventory action request from the supplier interface application 414. In an one embodiment of the present invention, the supplier batch inventory action request includes the transmission of data indicative of the allotment of one or more pieces of inventory to be sold by the inventory management system. The supplier batch inventory action request can also include communications transmitted by a supplier to modify an existing allotment of batch inventory. Additionally, the supplier batch inventory action request can also include a new allotment from a new or existing supplier 240 of inventory items.

At block 1404, the inventory processing application 416 identifies SKU group 502, SKU 504, and SKU inventory 506 records matching the batch inventory action request. In one embodiment of the present invention, the batch inventory request can refer directly to a preexisting instance of a SKU group 502, SKU 504, or SKU inventory. Alternately, the action request may request a new SKU inventory 506 record be generated. At decision block 1406, a test is conducted to determine whether the SKU group, SKU, and SKU inventory records matching the batch inventory action request exist. If none exist, at block 1408, the inventory processing application 416 generates the corresponding SKU group, SKU and/or SKU inventory records. For example, if a supplier 240 issues a batch inventory action that includes a new allotment of rooms for a hotel having a cost different from a previous allotment, the inventory management system 36 would generate a new SKU inventory 506 record corresponding to the new allotment. However, the inventory processing application 416 would not generate new SKU group or SKU records if they already exist.

If there is a matching SKU inventory 506 record at block 1406, or once a SKU inventory 506 record has been created, at block 1410, the inventory processing application 416 updates the matching SKU inventory record with the batch inventory action request. In one embodiment of the present invention, this could include populating a new instance of the SKU inventory record with the number of inventory items allotted by the supplier 240. Alternatively, the update of the information can include adjusting the allotment of inventory items described in the SKU inventory record according to an addition or subtraction with the batch inventory action request. Still further, the update of the information can include adjusting other inventory item characteristics, such as the cost of the inventory items, limitation of uses, etc. At block 1412, the inventory processing application 416 returns confirmation of the batch inventory action request that will be returned to the supplier 240. At block 1414 the subroutine 1400 returns to routine 1300.

Figure 15:
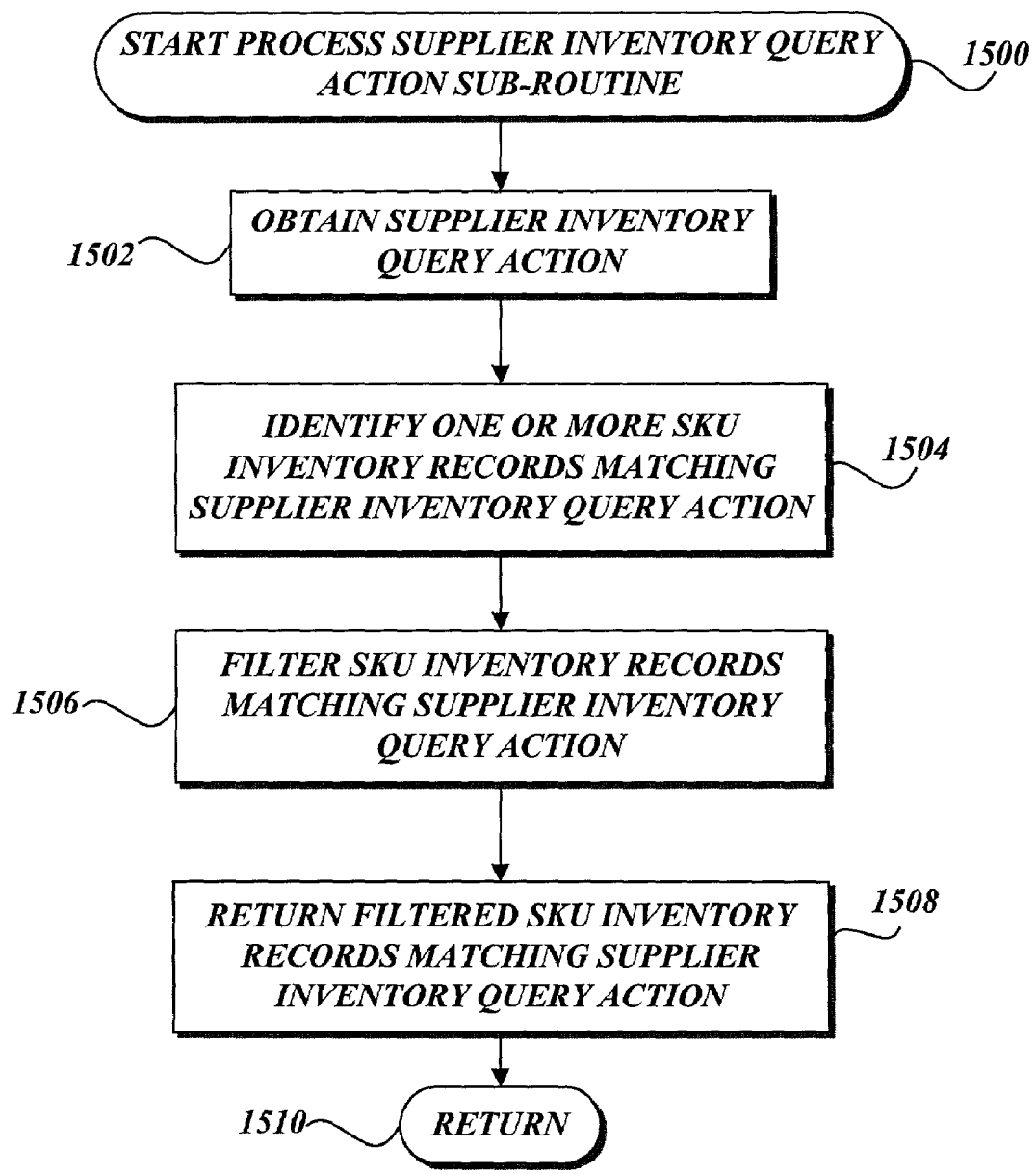
FIG. 15 is a flow diagram illustrating a supplier inventory query action sub-routine implemented by an inventory processing application in accordance with the present invention.

In another example, FIG. 15 is a flow diagram of a process supplier inventory query action subroutine 1500 utilized by the inventory processing application 416 of the travel server 236 as an alternative subroutine for block 1304 (FIG. 13). At block 1502, the inventory processing application 416 obtains a supplier inventory action request from the supplier interface application 414. The supplier inventory action request includes a set of criteria. At block 1504, the inventory processing application 416 identifies SKU group, SKU, and SKU inventory records matching the supplier inventory query action. At block 1506, the inventory processing application 416 filters the SKU group, SKU and SKU inventory records matching the supplier inventory query action. In one embodiment of the present invention, some of the data contained within the SKU group, SKU and SKU inventory may not be released to a supplier. For example, although a supplier 240 may know the cost issued with allotting the inventory, the travel server 236 may not wish the supplier 240 to know at what price the travel server is selling it to a consumer. Accordingly, the inventory processing application 416 can filter this data out prior to it being transmitted to the supplier. At block 1508, the inventory processing application 416 returns the filtered SKU inventory records matching the supplier inventory query action. In an actual embodiment of the present invention, the transmitted data can include utilization data including not only a certain number of inventory items available within a SKU inventory 506 record, but also some type of history that allows a supplier 240 to monitor the progress of the inventory being utilized. One skilled in the relevant art will appreciate that this allows a supplier 240 to monitor in real time the number of inventory items being sold by the travel server. The real time data can then be utilized for preparation such as necessary staff, and/or to allow the supplier to adjust the cost of the unsold inventory (as illustrated in routine 1400, FIG. 14) depending on the sale activity of the particular inventory item. At block 1510, the sub-routine returns.

Returning to FIG. 13, once the inventory processing application 416 has executed the various supplier inventory action subroutines (e.g., FIGS. 14 and 15) at block 1304, at block 1306 the results of the request process are transmitted to the supplier 240. In one illustrative embodiment of the present invention, the results can include a confirmation that the action was accomplished. The results can also include data modifying the inventory action, such that the supplier can modify its records accordingly. At block 1308, the routine 1300 terminates.

Figure 16:
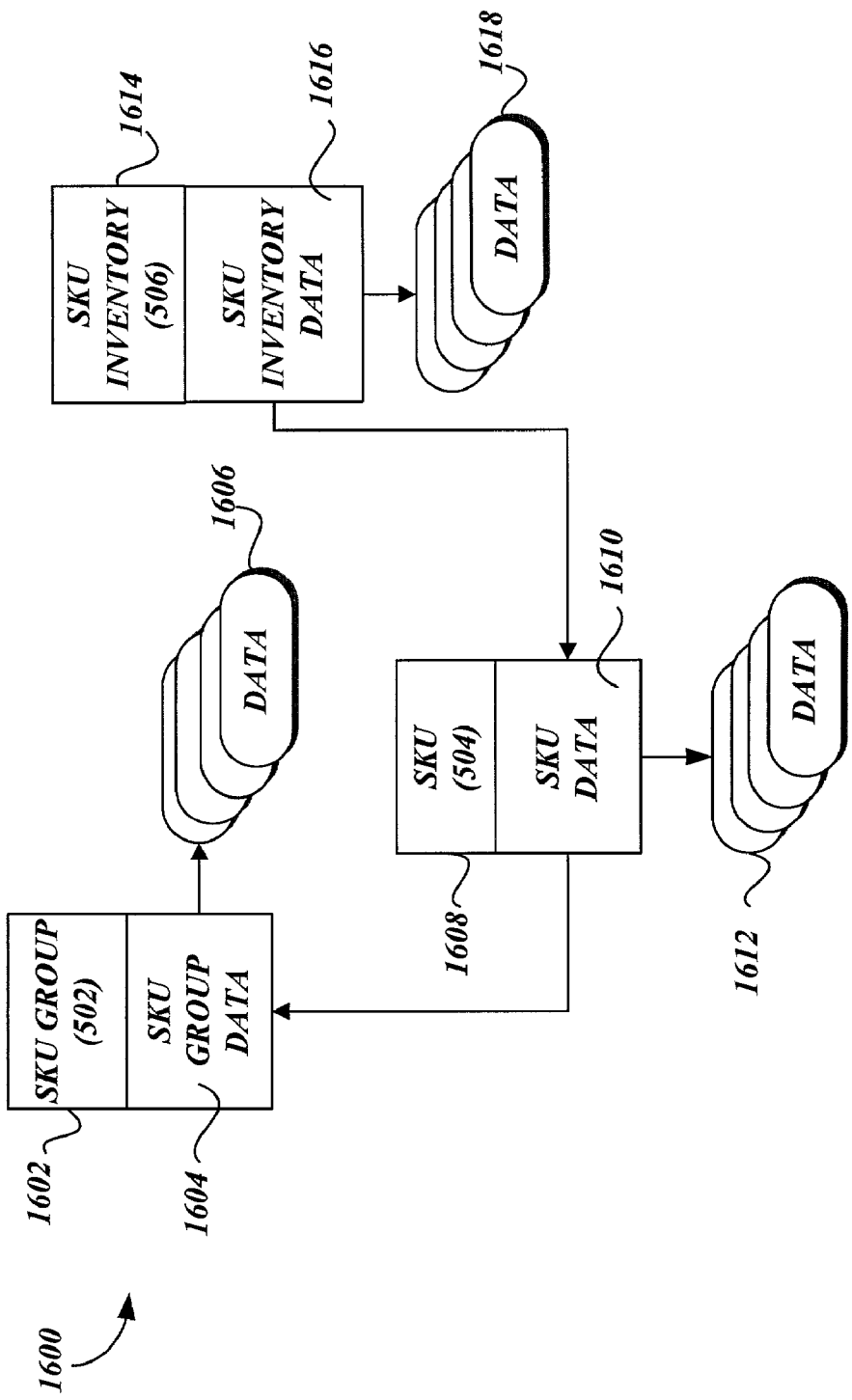
FIG. 16 is a block diagram representative of a data relationship for an inventory relational database utilized by an inventory processing application in accordance with the present invention.

To accomplish the data management and processing routines illustrated above, the travel server 236 may store the inventory item data in the data store 238 according to a relational database data storage format. FIG. 16 is a block diagram illustrative of a relational database data relationship 1600 utilized to store inventory data in accordance with the present invention. In one embodiment of the present invention, the data relationship 1600 may be customized to include one or more data tables or data fields that correspond to unique aspects of particular inventory items (e.g., a bed type associated with hotel room inventory items). However, one skilled in the relevant art will appreciate that alternative data storage formats or alternative relational database data relationships may be utilized in accordance with the present invention.

As illustrated in FIG. 16, the data relationship 1600 defines a SKU group table 1602 operable to include inventory item data related to a SKU group 502 record (FIG. 5). In an actual embodiment of the present invention, the SKU group table 1602 can include SKU group data 1604 such as a SKU Group ID, a vendor identifier, a property address, a tax area identification code, SKU group contact information and the like. Additionally, in accordance with a relational database, one or more of the fields in the SKU group data 1602 may reference one or more additional data tables to further define the SKU group data 1602, illustrated at 1606.

The data relationship 1600 also defines a SKU table 1608 operable to include inventory item data related to a SKU 504 record (FIG. 5). In an actual embodiment of the present invention, the SKU table 1608 can include SKU data 1610 such as a SKU group ID field, unit type information, a cancellation penalty information, service charge information, extra person information and reservation information, and the like. Similar to the SKU group table 1602, one or more of the fields in the SKU data 1610 may reference one or more additional data tables to further define the SKU data 1610, illustrated at 1612.

With continued reference to FIG. 16, the data relationship 1600 further defines a SKU inventory table 1614 operable to include inventory item data related to a SKU inventory 506 record (FIG. 5). In one embodiment of the present invention, the SKU inventory table 1614 can include SKU inventory data 1616 such as a SKU ID field, a quantity field, supplier cost information, consumer price information, an inventory utilization information, use restriction information, dependencies information, and the like. Additionally, one or more of the fields in the SKU inventory data 1616 may reference one or more additional data tables to further define the SKU inventory data 1616, illustrated at 1618

In addition to managing inventory, the travel server 236 of the travel management system 230 may be utilized to manage reservation requests from one or more client computing devices 232. One skilled in the relevant art will appreciate that a reservation request may include an offer to reserve a right to a serve (e.g., a right to stay in a hotel room on a particular evening). However, a reservation request may also include an offer to purchase or otherwise transfer the rights to a tangible good (e.g., an offer to purchase a book). Additionally, the travel server 236 may be utilized to transmit corresponding communications to the client computing devices 232 and suppliers 240. To facilitate reservation request processing, the travel server 236 utilizes a reservation data relationship to sore and manager data required to process a reservation request.

Figure 17:
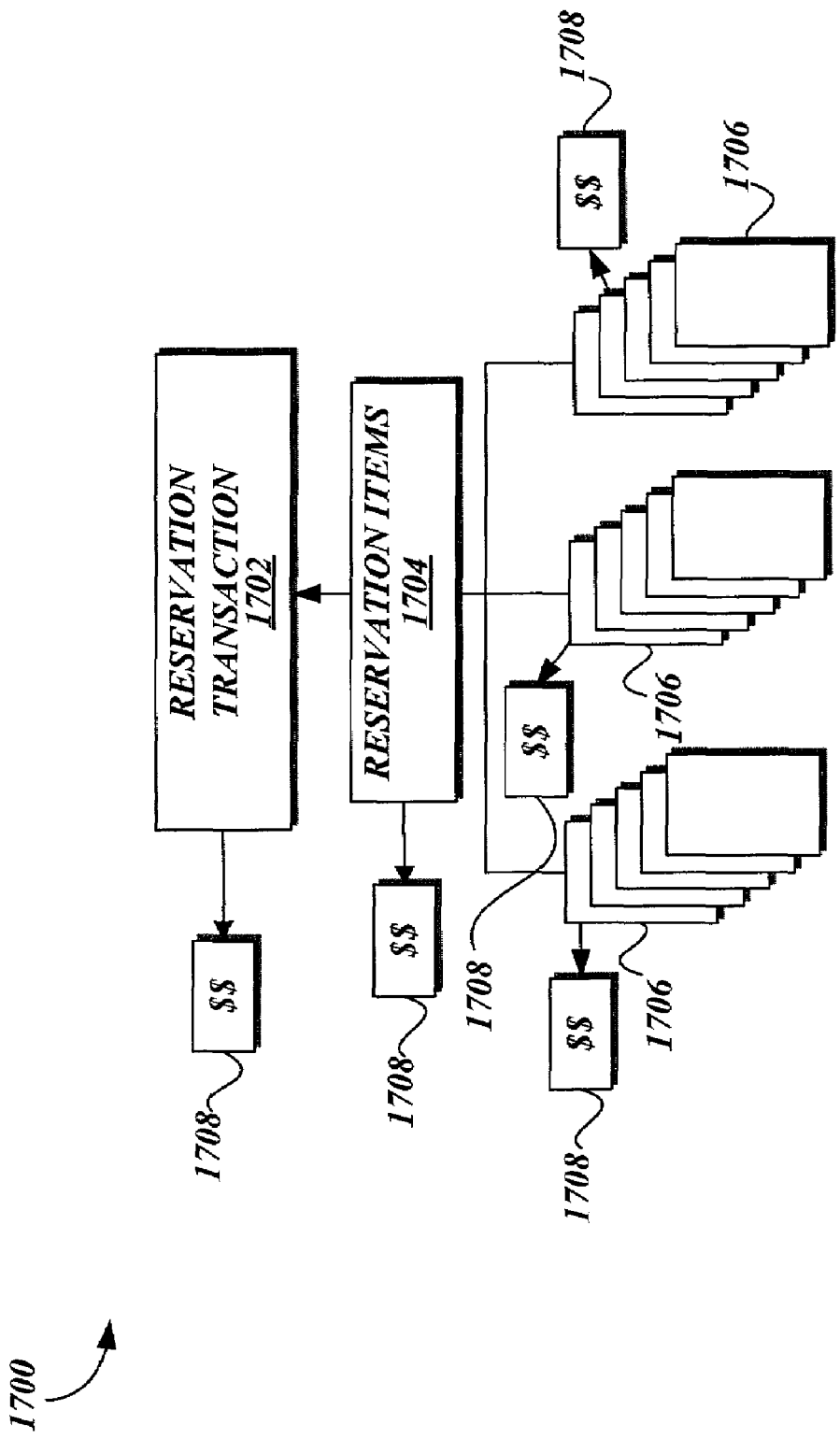
FIG. 17 is a block diagram of a three detail level reservation data relationship formed in accordance with the present invention.

FIG. 17 is a block diagram of a reservation data relationship 1700 utilized by the reservation processing application 418 of the travel server 236 to manage reservation requests in accordance with the present invention. As illustrated in FIG. 17, a reservation request received by a client computing device 232 can be characterized by three levels of detail. The first level of detail utilized to describe a reservation request is a reservation transaction 1702 record. Each reservation transaction 1702 record can be associated with one or more reservation requests, and can be utilized to track multiple reservation requests from a user or group of users that may be grouped together.

A second level of detail utilized to define a reservation request is a reservation items 1704 record. Each reservation items 1704 record corresponds to a reservation transaction 1702 record and defines one or more inventory items that are associated with a particular reservation request and that have a common characteristic (e.g., common vendor, common reservation number, etc.). For example, assume that through a reservation request, a user request a three-day stay at a hotel, airfare and a rental car for two days. The travel server 236 could generate reservation items 1704 records for the hotel reservation, the airfare reservation, and the rental car reservation. Although only one reservation items 1704 record is illustrated in FIG. 17, one skilled in the relevant art will appreciate that any number of reservation items 1704 may reference a reservation transaction 1702 record.

A third level of detail utilized to define a reservation request is one or more reservation inventory 1706 records. Each reservation inventory 1706 record corresponds to a reservation items 1704 record and is associated with a particular instance of an inventory item associated with the reservation request. With reference to the previous example, the travel server 236 could create three reservation inventory 1706 records associated with a hotel reservation items 1704 record and corresponding to each night stay, two inventory item records associated with an airline reservation items record and corresponding to the round trip airline flights, and two reservation inventory records associated with a rental car inventory item records and corresponding to the two-day rental car reservation. In one embodiment of the present invention, each reservation inventory 1706 record is associated with a SKU inventory 506 (FIG. 5) and includes reservation data relating to the particular instance of the inventory item. However, in some instances, a reservation inventory 1706 record may be generated for additional inventory items outside of the scope of the SKU inventory 506 records (e.g., an overbooking allotment).

With continued reference to FIG. 17, the reservation data relationship also includes one or more price components 1708 including data related to consumer prices for various aspects of a reservation request. Additionally, in one embodiment of the present invention, a price component 1708 may be associated with a reservation transaction 1702, reservation items 1704, and reservation inventory 1706 record. For example, a price component 1708 may be associated with a reservation inventory 1706 record and can include data related to the consumer price for reserving an instance of the inventory item. Another price component 1708 may be associated with a reservation items 1704 record and could include price data related to the reservation items level, such as a price adjustment for a package reservation. Still further, a price component 1708 may be associated with a reservation transaction component 1702 and could include data related to the reservation transaction level, such as price adjustments for an employee discount, a Web-based reservation request, etc. As will be explained below, the various price component 1708 data may be grouped together and utilized to generate a total consumer price for the reservation request.

One skilled in the relevant art will appreciate that the reservation data relationship 1700 may be applied to a variety of inventory item reservation requests including, but not limited to hotel reservations, airline reservations, cruise reservations, ticket reservations, rental property reservations, sale or lease of tangible goods, and the like. Additionally, one skilled in the relevant art will appreciate that the processing of a particular reservation request may not utilize all three levels of detail in the reservation data relationship 1700.

Figure 18:
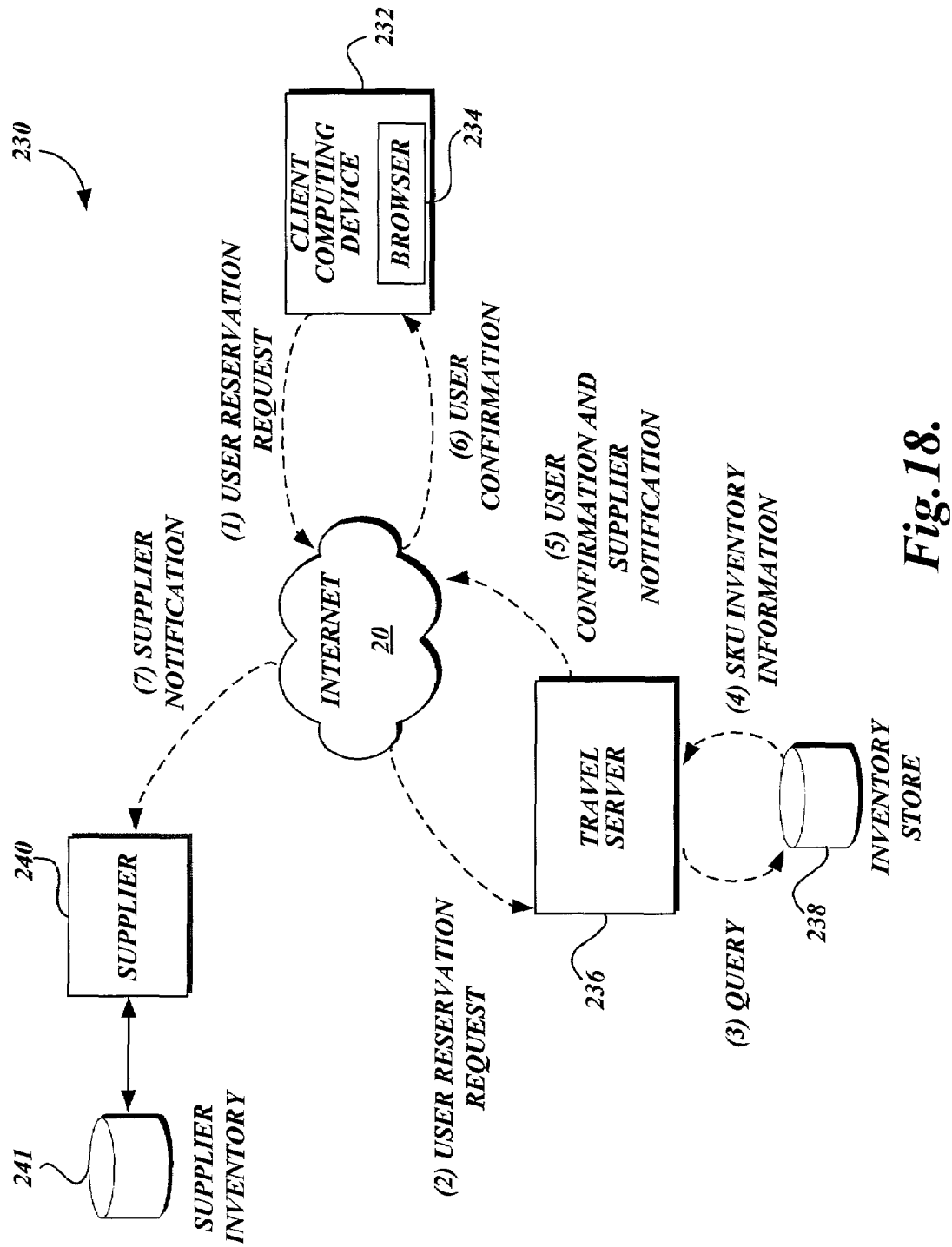
FIG. 18 is a block diagram of the travel management system of FIG. 2 illustrating a client computing device request for a reservation made in accordance with the present invention.
Figure 19:
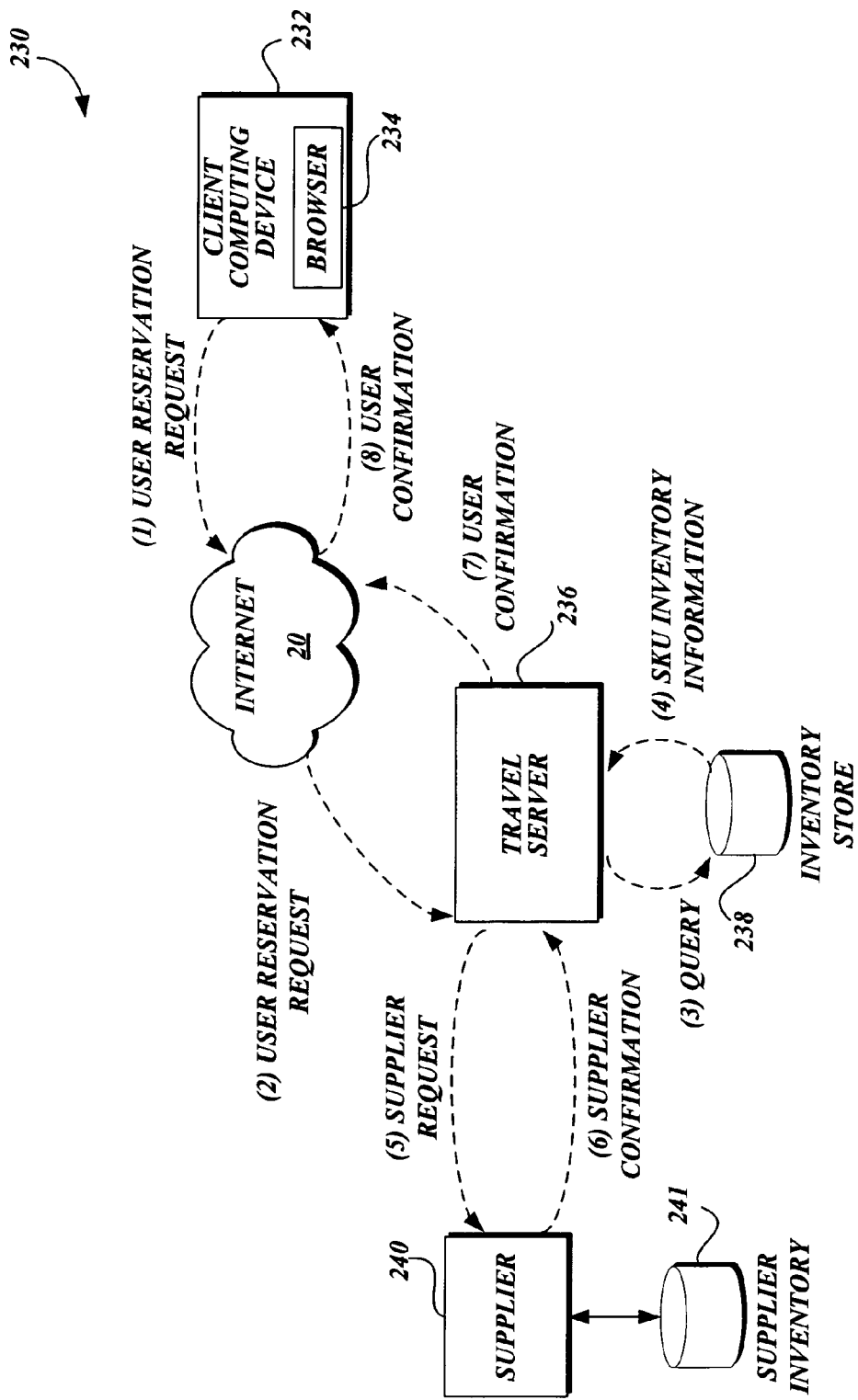
FIG. 19 is a block diagram of the travel management system of FIG. 2 illustrating a client computing device request for a reservation from a supplier not continuously connected to the travel management system in accordance with the present invention.

As previously described, in accordance with an aspect of the present invention the travel server 236 may be utilized to perform a variety of reservation request processing tasks. FIGS. 18 and 19 block diagrams of the travel management system 230 of FIG. 2 illustrating various embodiments relating to reservation request processing in accordance with the present invention. Referring to FIG. 18, in accordance with an aspect of the present invention, the travel management system 230 may be utilized to obtain and process client computing device 232 reservation requests. As illustrated in FIG. 18, a client computing device 232 issues a user reservation request. The user reservation request is transmitted via a communication network, such as Internet 20, and is received by the travel server 236. The travel server 236 issues a query to the inventory store 238 which returns inventory item data stored according to the inventory item data relationship 500 and matching the query criteria. Additionally, the travel server 236 generates reservation data according to the reservation data relationship 1700. The travel server 236 processes the user reservation request, the inventory data and the reservation data. If the reservation processing is successful, the travel server 236, via Internet 20, transmits a confirmation to the client computing device 232 and transmits a notification to one or more suppliers 240 corresponding to the reserved inventory item.

With reference to FIG. 19, the travel management system 230 may be utilized to process client computing device 232 reservation requests for suppliers 240 not continuously connected to the travel management system 230. Similar to FIG. 18, a client computing device 232 issues a user reservation request. The user reservation request is transmitted via a communication network, such as Internet 20, and is received by the travel server 236. The travel server 236 issues a query to the inventory store 238 which returns inventory item data stored according to the inventory item data relationship 500 and matching the query criteria. Additionally, the travel server 236 generates reservation data according to the reservation data relationship 1700. The travel server 236 processes the user reservation request, the inventory data and the reservation data. If the reservation processing is successful, the travel server 236 transmits a supplier notification to the supplier 240, such as through facsimile, etc. The supplier 240 obtains the notification and confirms the reservation to the travel server 236. The travel server 236 then transmits the confirmation to the client computing device 232.

Figure 20:
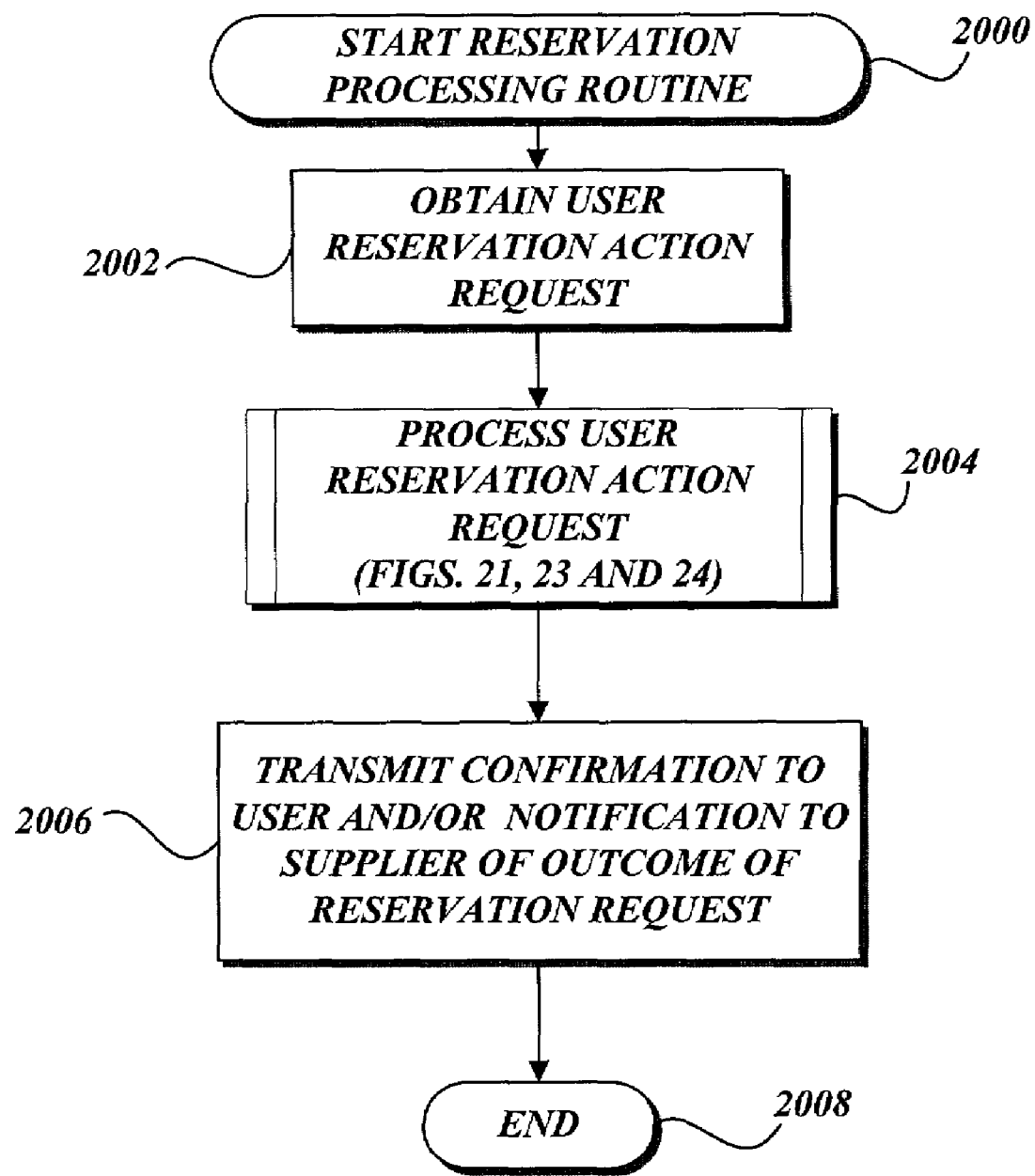
FIG. 20 is a flow diagram illustrating a reservation processing routine implemented by a reservation processing application in accordance with the present invention.

FIG. 20 is a flow diagram illustrative of an inventory request processing routine 2000, implemented by the travel server 236 in accordance with the present invention. At block 2002, the client interface application 412 of the travel server 236 obtains a user reservation action request. In one embodiment of the present invention, the user reservation action request can include a request for a new reservation, a request for cancellation of an existing reservation and a request for modification of an existing reservation. However, one skilled in the relevant art will appreciate that the action request can include additional reservation related actions. At block 2004, the reservation processing application 418 of the travel server 236 processes the reservation action request. Accordingly, the reservation processing application 418 may implement different processing sub-routines dependent on the user reservation action request.

Figure 21:
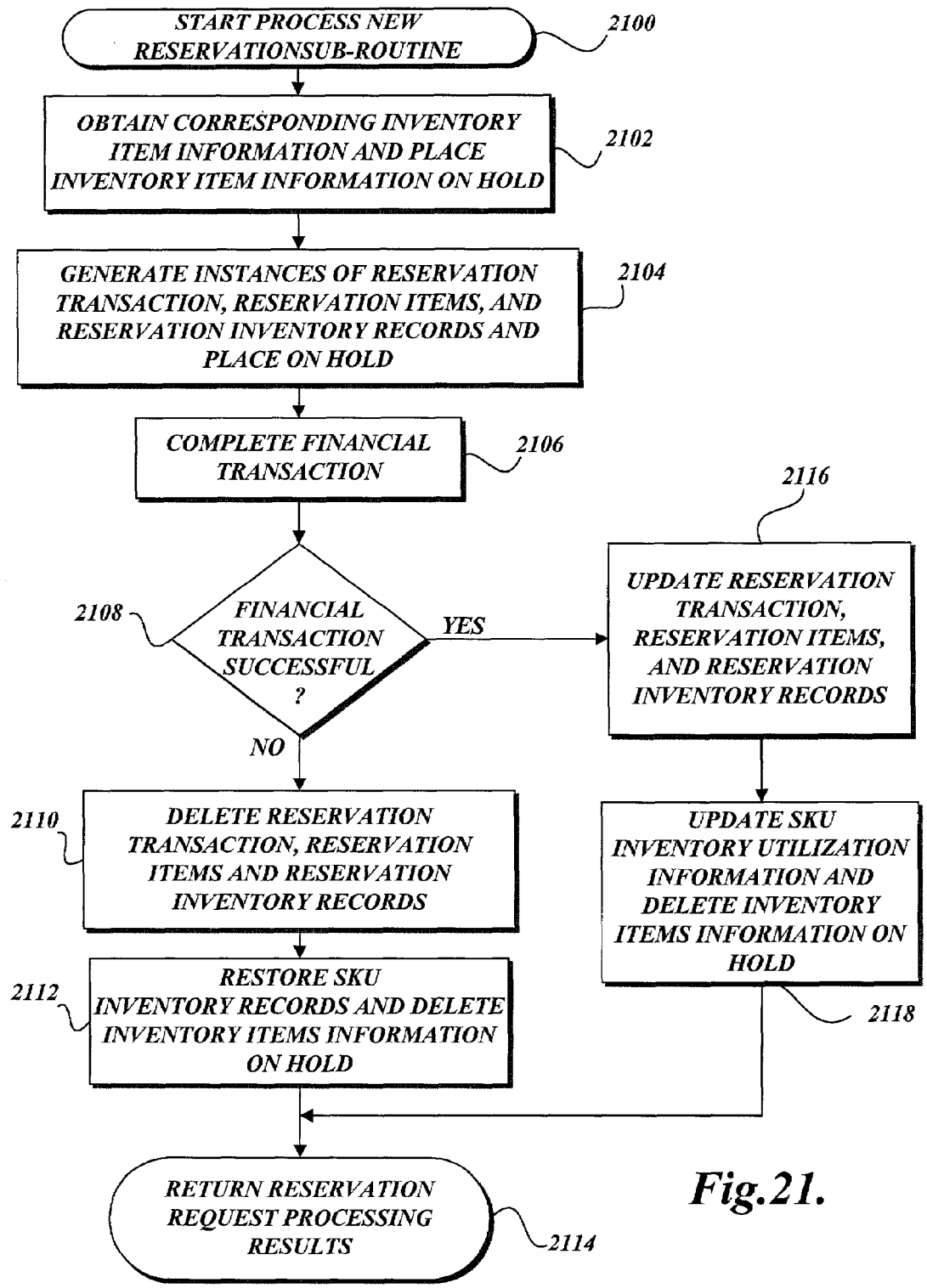
FIG. 21 is a flow diagram illustrating a process new user reservation request sub-routine implemented by a reservation processing application in accordance with the present invention.

In a first illustrative example, FIG. 21 is a flow diagram of a process new reservation request sub-routine 2100 implemented by the reservation processing application 418 to process a new consumer reservation request in accordance with the present invention. In one embodiment of the present invention, similar to the user query for available inventory (block 702 of FIG. 7), the user reservation request obtained by the client interface application 412 and transferred to the reservation processing application 418 includes a set of criteria that may be utilized to identify inventory data stored within the inventory store 238 that matches set of user specified criteria. The set of criteria can include a date or range of dates for use if the inventory can exist on multiple dates. The set of query criteria can also include a variety of inventory specific identifiers such as a selection of a hotel, an airline, a cruise and any combination thereof. The set of query criteria can also include the selection of preferences for specific type of inventory items. For example, the set of criteria can include a selection of a type of seat on an airline flight (e.g., window, aisle, first class), a specific seat on an airline flight, a hotel room type, a specific room in a hotel, a cabin type, a specific cabin on a cruise ship, smoking preferences, special meal requests, amenities, proximity to additional amenities, and the like. The set of criteria can further include the identification of a specific product, such as a title of a book, a product code, an order number, etc. Additionally, the set of criteria may also include one or more prestored user preferences that will facilitate the selection of matching inventory items from the inventory store 238. For example, the travel server 236 may store the set of criteria associated with a user request for inventory and reutilize the same set of criteria if the user subsequently requests a reservation.

At block 2102, the reservation processing application 418 obtains a set of user specified criteria from the client interface application 412. The reservation processing application 418 retrieves SKU group 502, SKU 504 and SKU inventory 506 records matching the set of criteria and reduces the SKU inventory 506 allotment by the reservation request amount. For example, if the reservation request included a request for two nights stay at a particular hotel, the reservation processing application 418 select a matching SKU inventory 560 record for each night and reduce the room allotment for each SKU inventory record by one. In an illustrative embodiment of the present invention, the reservation processing application 418 may utilize a process such as the query available inventory sub-routine 800 (FIG. 8). Alternatively, the reservation processing application 418 may also obtain inventory data previously obtained by the inventory processing application 416 in accordance with the present invention.

In one embodiment of the present invention, the travel server 236 may process multiple reservation requests concurrently. Accordingly, to avoid reserving the same instance of inventory item, the reservation processing application 418 places the inventory item information obtained from the inventory store 238 in a hold status. In one embodiment of the present invention, the reservation processing application 418 adds records to a hold table containing the SKU inventory 506 inventory item information previously taken from the SKU inventory records 506. With reference to the previous example, the reservation processing application 418 would place the SKU inventory 506 record data for each night in the hotel room in the hold table. Thus, although the inventory items described in the hold table have not been reserved, they are at least temporarily removed from the available inventory. One skilled in the relevant art will appreciate that alternative inventory item reservation data management methods/indicators may be practiced with the present invention.

At block 2104, the reservation processing application 418 generates instances of a reservation transaction 1702 record, one or more reservation items 1704 records, and one or more reservation inventory 1706 records. Similar to the inventory item records, the reservation transaction 1702, reservation items 1704, and reservation inventory 1706 are placed on hold. At block 2106, the reservation processing application 2106 completes the financial transaction. In one embodiment of the present invention, the reservation processing application 418 obtains the price component 1708 (FIG. 17) associated with the reservation transaction 1702, reservation items 1704, and reservation inventory 1706 records and attempts to complete a financial transaction. The completion of the financial transaction can include obtaining credit card information and generating a charge. The completion of the financial transaction can also include obtaining checking account information and generating a transaction. One skilled in the relevant art will appreciate that alternative financial transaction methods may be practiced with the present invention, including, but not limited, prepaid accounts, third-party transaction providers, and the like.

At decision block 2108, a test is conducted to determine whether the financial transaction was successfully completed. If the transaction was not successful, or if the financial transaction cannot be verified after a defined period of time, at block 2110, the reservation transaction 1702, reservation items 1704, and reservation inventory 1706 records are deleted. At block 2112, the reservation processing application 418 restores the SKU inventory 506 record information stored in the hold table. More specifically, the reservation processing application 418 adds the inventory item data stored in the hold table back to the corresponding SKU inventory 506 records to allow the inventory item to be resold. The reservation processing application 418 then deletes the inventory item information corresponding to the inventory item in the hold table. At block 2114, the sub-routine 2100 returns to block 2004 of routine 2000 with an unsuccessful result indication.

Returning to decision block 2108, if the financial transaction is successful, at block 2116, the reservation transaction 1702, reservation items 1704, and reservation inventory 1706 are updated to indicate a successful transaction. At block 2118, the inventory item information stored in the hold table is deleted. Additionally, the SKU inventory 506 utilization information may be updated to indicate the successful reservation of an inventory item. At block 2114, the sub-routine 2100 returns to block 2004 of routine 2000 with a successful result indication.

Figure 22:
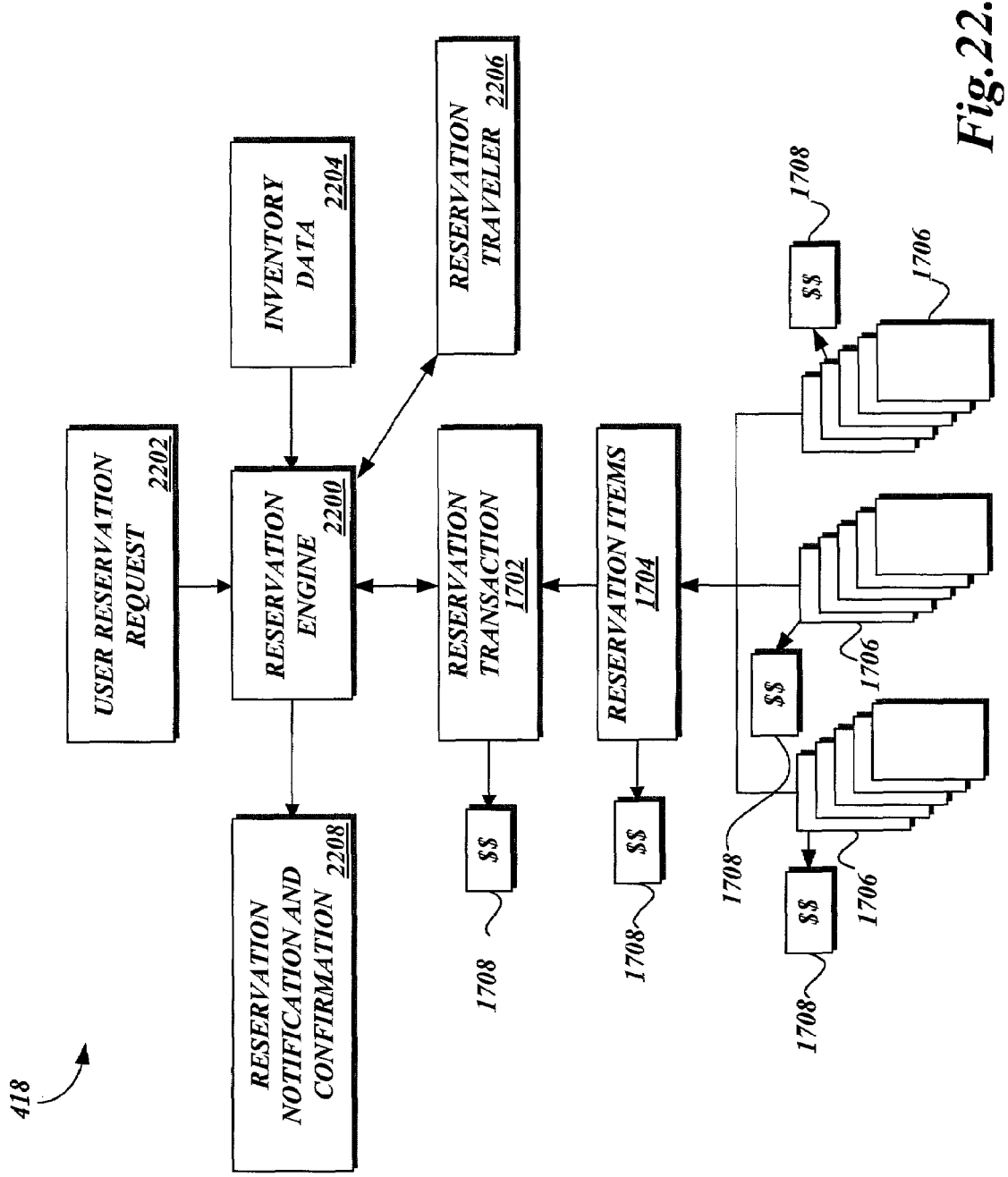
FIG. 22 is a block diagram illustrating a data relationship utilized by a reservation processing application to process a reservation request made in accordance with the present invention.

FIG. 22 is a block diagram illustrating the data relationships utilized by the reservation processing application 418 of the travel server 236 to process a new reservation request issued by a client computing device 232. In one embodiment of the present invention, the reservation processing application 418 may function as a processing engine 2200 to obtain and process various blocks of data. As illustrated in FIG. 22, the processing engine 2200 obtains a block of data relating to a user reservation request 2202 and a block of data relating to the inventory data 2204 associated with the inventory items matching the user reservation request.

As described with regard to block 2104 (FIG. 21), the processing engine 2200 generates a reservation transaction 1702 record, one or more reservation items 1704 records, and one or more reservation inventory 1706 records corresponding to the user reservation request 2202 and the inventory data 2204. Furthermore, as illustrated in FIG. 22, the processing engine can also generate, or otherwise obtain, one or more reservation traveler data blocks 2206 (depending on the number of travelers and the requirements for traveler information) operable to define one or more consumer specified preferences. Accordingly, the processing engine 2200 generates and then utilizes data associated with the reservation transaction 1702 record, the one or more reservation items 1704 records, and the one or more reservation inventory 1706 records for processing a reservation request.

Utilizing the user reservation request data 2002, the inventory item data 2004, the reservation data 1700, and the reservation traveler 2004 data blocks, the processing engine 2200 then processes the reservation request and generates various results that may be transmitted by the reservation processing application 418 to a client computing device 232 and/or a corresponding supplier 240. One skilled in the relevant art will appreciate that the data diagram of FIG. 22 is done for illustrative purposes and that alternatives may be implemented within the scope of the present invention.

Figure 23:
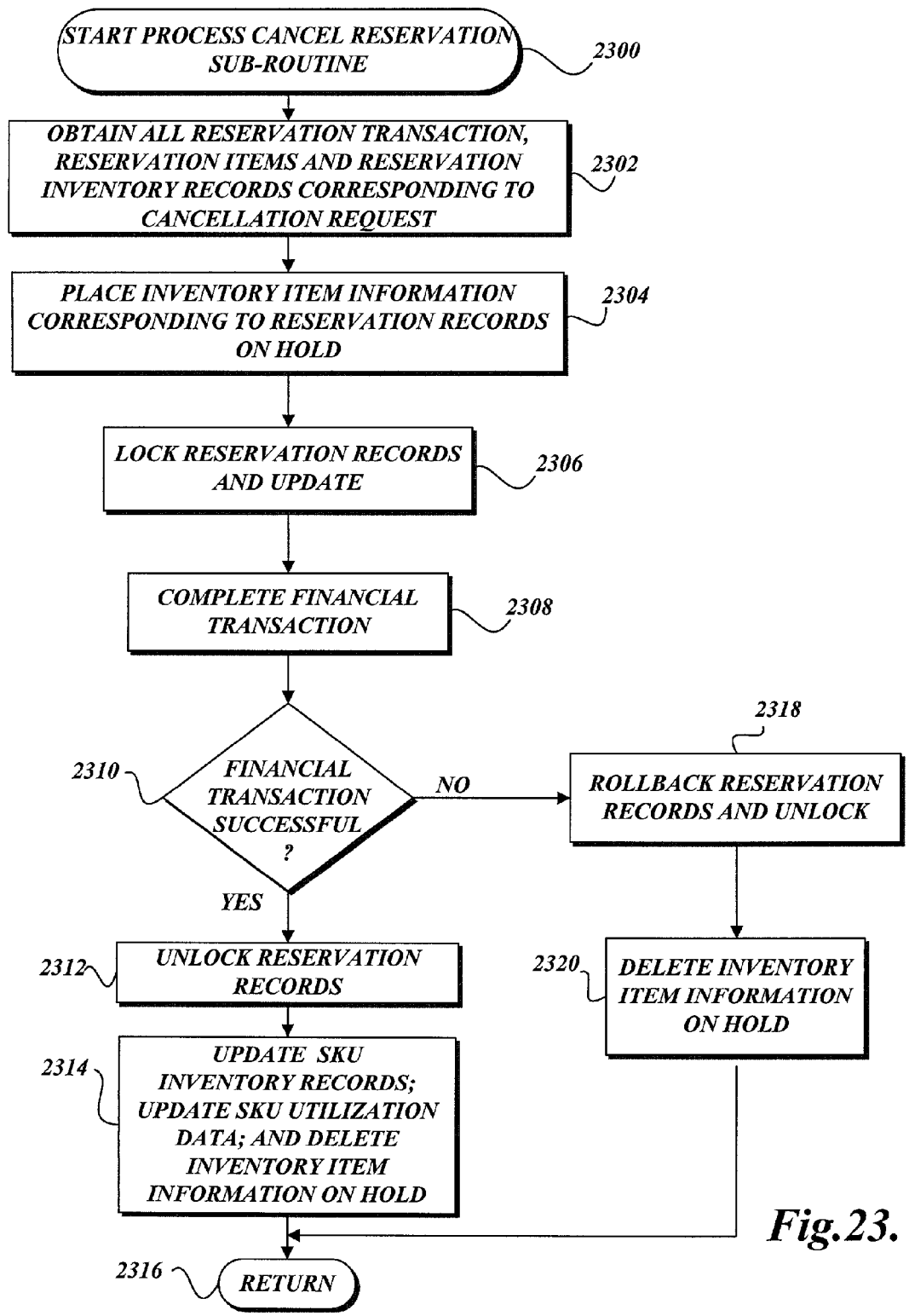
FIG. 23 is a flow diagram of a process user reservation cancellation request sub-routine implemented by a reservation processing application in accordance with the present invention.

In another illustrative example, FIG. 23 is a flow diagram of a process reservation cancellation request sub-routine 2300 implemented by the reservation processing application 418 to cancel a pre-existing consumer reservation request in accordance with the present invention. At block 2302, the reservation processing application 418 obtains all reservation transaction 1702, reservation items 1704 and reservation inventory 1706 records ("the reservation records") corresponding to the reservation modification request. In one embodiment, the user reservation action request obtained by the client interface application 412 and transferred to the reservation processing application 418 includes data for identifying reservation transaction 1702, reservation items 1704 and reservation inventory 1706 records corresponding to the cancellation request. For example, the user reservation action request can include data identifying a reservation number, a confirmation number, a user name associated with the reservation, and/or other identifying criteria. Additionally, in one embodiment of the present invention, the user reservation action request can request for the cancellation of only a portion of a previous reservation. To verify whether a partial reservation cancellation is possible, the reservation items 1704 and/or reservation inventory 1706 may include cancellation information as part of the record data.

At block 2304, the reservation processing application 418 places the inventory item information related to the cancellation request into the inventory item information hold table. Similar to the process described with respect to block 2102 (FIG. 21), the hold table provides a mechanism to manage inventory item data that does not belong either as part of available inventory or as part of a confirmed reservation. At block 2306, the reservation processing application 418 locks the reservation records. Additionally, the reservation processing application 418 updates the reservation records as if the processing cancellation request was successful.

At block 2308, the reservation processing application attempts to complete the financial transaction. In one embodiment of the present invention, the reservation processing application 418 attempts to credit the consumer price amount, minus any cancellation penalties, to the user. For example, the reservation processing application 418 may attempt to credit the same financial institution credit account utilized to make a purchase. In one embodiment, if a cancellation is not possible, such as due to a stated cancellation policy, the reservation processing application 418 may return an error at the time it attempts to recall the reservation transaction 1702, reservation items 1704 and reservation inventory 1706 records. Alternatively, the reservation processing application 418 may return an error at the time it attempts to complete the financial transaction.

At decision block 2310, a test is conducted to determine whether the financial transaction is successful. If the financial transaction is successful, at block 2312, the reservation processing application 418 unlocks the reservation records. At block 2314, the reservation processing application 418 updates all SKU inventory 506 records corresponding to the inventory item data stored in the hold table. For example, if the reservation cancellation request relates to an evening in a hotel, the reservation processing application 418 would increment a number available field in a SKU inventory 506 record corresponding to the particular hotel room inventory item. Additionally, the reservation processing application 418 updates the corresponding SKU inventory 506 utilization information. Finally, the reservation processing application 418 deletes all inventory item information in the hold table corresponding to the cancelled inventory items. At block 2316, the sub-routine 2300 returns to block 2004 of routine 2000.

Returning to decision block 2310, if the financial transaction is unsuccessful or if the cancellation request cannot otherwise be processed, at block 2318, the reservation processing application 418 rolls back the reservation records to reflect the state of the reservation records prior to unsuccessful cancellation request. Additionally, the reservation processing application 418 unlocks the reservation records. At block 2320, the reservation process application 418 deletes the inventory item information in the hold table corresponding to the inventory items related to the cancellation request. At block 2316, the sub-routine 2300 returns to block 2004 of routine 2000.

Figure 24A:
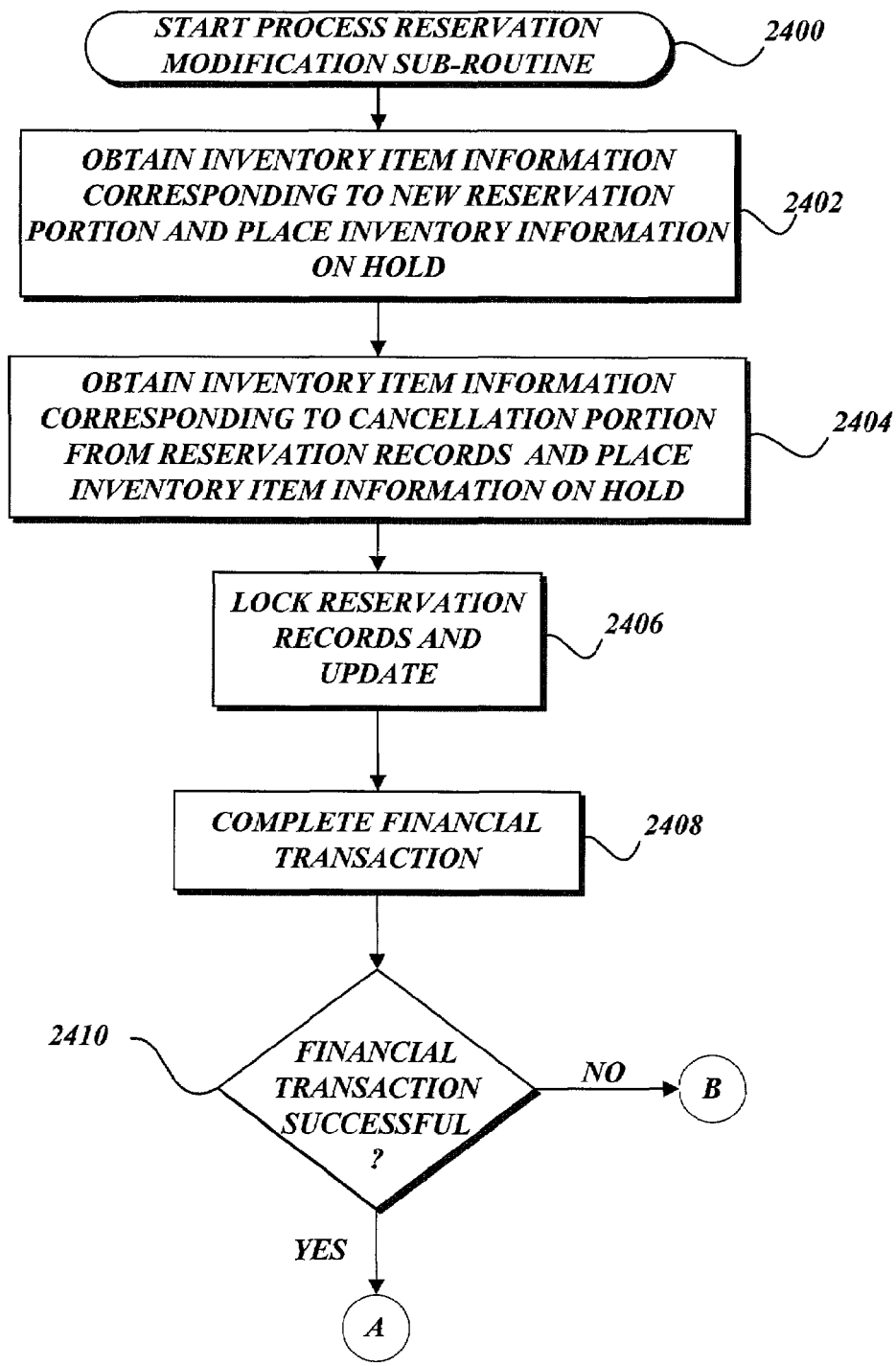
FIGS. 24A and 24B are flow diagrams of a process user reservation modification request sub-routine implemented by a reservation processing application in accordance with the present invention.
Figure 24B:
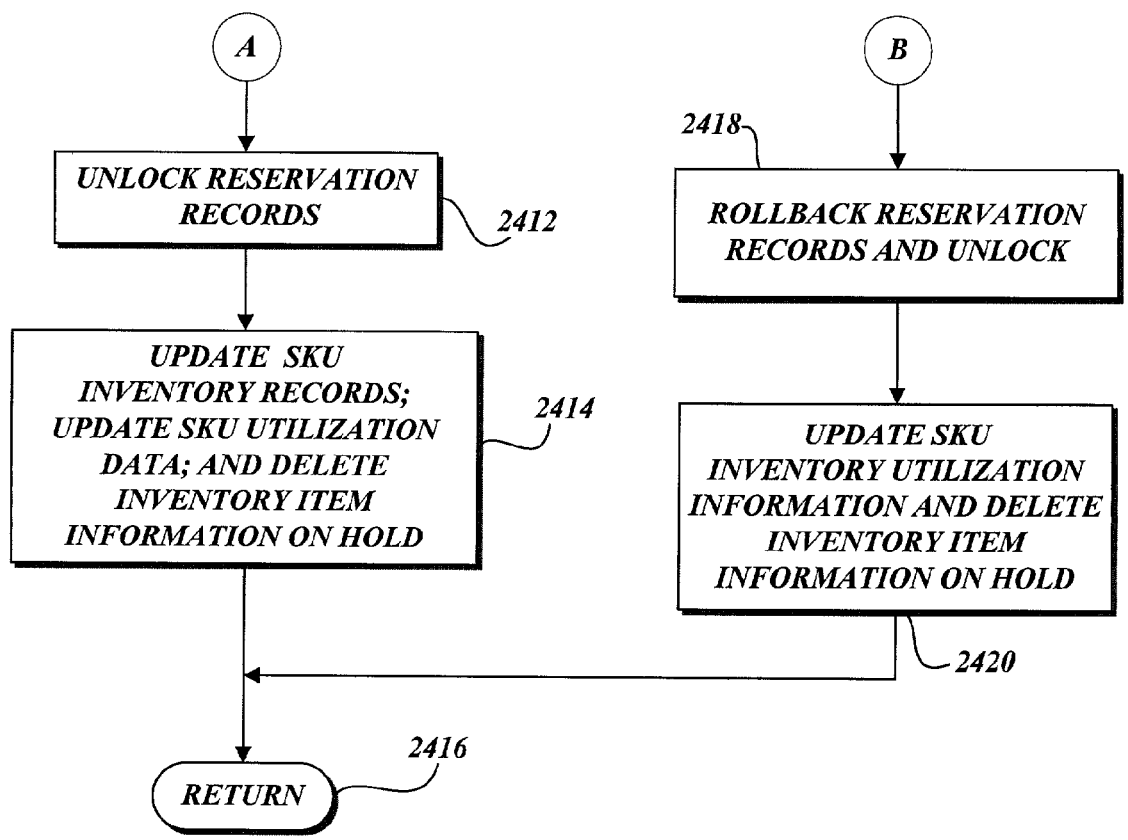

In another illustrative example, FIGS. 24A and 24B are flow diagrams of a process reservation modification request sub-routine 2400 implemented by the reservation processing application 418 to modify a pre-existing consumer reservation request in accordance with the present invention. One skilled in the relevant art will appreciate that a reservation modification can be processed as a concurrent new reservation process and reservation cancellation process. With reference to FIG. 24A, at block 2402, the reservation processing application 418 obtains SKU group 502, SKU 504 and SKU inventory 506 inventory item information corresponding to a new reservation portion of the modification request and places the inventory information on hold. In one embodiment of the present invention, the reservation processing application 418 places the inventory item information in a hold table. Similar to the discussion associated with block 2102 (FIG. 21), the reservation processing application 418 obtains, from the client interface application 412, a set of user specified criteria and identifies corresponding SKU inventory 506 information.

At block 2404, the reservation processing application 418 obtains inventory item information corresponding to the reservation records from the cancellation portion of the modification request. The reservation processing application 418 places the inventory item information into the hold table. Accordingly, the hold table includes inventory item information relating to the new inventory items being reserved (block 2402) and the inventory items being returned to the inventory store 238 (block 2404).

At block 2406, the reservation processing application 418 locks the reservation records. Additionally, the reservation processing application 418 updates the reservation records as if the processing cancellation request was successful. In one embodiment of the present invention, the updating of the reservation transaction 1702, reservation items 1704 and reservation inventory 1706 records may depend on whether the modification involves a single or multiple suppliers 240. If the transaction involves multiple suppliers 240, the reservation processing application 418 marks the old reservation items 1704 and reservation inventory 1706 records associated with the cancelled portion of the modification request and updates the reservation transaction 1702, reservation items 1704 as successfully cancelled. Additionally, the reservation processing application 418 generates new reservation items 1704 and reservation inventory 1706 records associated with the new reservation portion of the modification request to the previous reservation transaction 1702 record. If the modification involves a single supplier 240, the reservation processing application 418 links the previous reservation transaction 1702, reservation items 1704 and reservation inventory 1706 records of the cancelled portion of modification request with the reservation transaction 1702, reservation items 1704 and reservation inventory 1706 records of the new portion of the modification request. Accordingly, the supplier 240 will have still have a single record, or linked records, having all the reservation information.

At block 2408, the reservation processing application 418 attempts to complete the financial transaction. In one embodiment of the present invention, the reservation processing application 418 processes the financial transaction as a net transaction between an amount being credited from the return of inventory (minus any cancellation/modification penalties) and an amount being charged from the new reservation. Alternatively, the financial transaction may be processed independently as a credit and debit accordingly.

At decision block 2410, a test is conducted to determine whether the financial transaction was successful. With reference now to FIG. 24B, if the financial transaction is successful, at block 2412, the reservation processing application 418 unlocks the reservation records. At block 2414, the reservation processing application 418 updates the SKU inventory 506 records. Similar to block 2118 (FIG. 21), the SKU inventory 506 utilization information may be updated to indicate the successful reservation of an inventory item. The reservation processing application 418 updates the corresponding SKU inventory 506 utilization information. Finally, the reservation processing application 418 deletes the inventory item information in the hold table associated with the new reservation portion of the modification request. The reservation processing application 418 deletes and incorporates the inventory item information associated with the cancellation portion of the modification request into the inventory store 238. As discussed above with respect to block 2316 (FIG. 23), the inventory information associated with the cancellation portion is incorporated into the inventory store 238 to be sold by the travel server 236. At block 2416, the routine 2400 returns to block 2004 of routine 2000.

Returning to decision block 2410, if the financial transaction is not successful, at block 2418, the reservation processing application 418 rolls back the reservation records associated with the new reservation portion of the modification request. The roll back of the reservation records is discussed above with respect to block 2318 (FIG. 23). At block 2420, the reservation processing application deletes the inventory item information relating to the cancellation portion of the modification request from the hold table. Additionally, the SKU inventory 506 utilization information may be updated to indicate the successful reservation of an inventory item. At block 2416, the routine 2400 returns to block 2004 of routine 2000.

Returning to FIG. 20, at block 2006, the reservation processing application 418 generates a confirmation to the client computing device 232 and a notification to the corresponding supplier 240. In one embodiment, as illustrated in FIG. 18, the client interface application 266 obtains the confirmation from the reservation processing application 418 and transmits the confirmation to the user via communication network 20. Alternatively, if the client computing device 232 is no longer connected to the travel management system 230, the client interface application 266 may send alternative communications such as facsimiles, electronic mail, and the like. Additionally, the supplier interface application 268 obtains the notification from the reservation processing application 418 and transmits the notification to a corresponding supplier 240, or suppliers. In one embodiment of the present invention, the notification includes data required by the supplier 240 to update one or more records of the user's reservation. For example, the notification can include the user's name, credit information, room preferences, travel service confirmation numbers, supplier confirmation numbers and other details that facilitates processing/acknowledgment of the reservation by the supplier 240. The notification information can also include various cost codes utilized by the supplier 240 to confirm reconcile accounts with the travel server.

Moreover, the supplier interface application 414 can also include a communication component for transmitting the notification according to a supplier specified format/communication medium. For example, the supplier interface application 414 may receive a standard encoded notification file, such as an XML file, from the reservation processing application 418. In conjunction with the communication component, the supplier interface application 414 may convert the standard notification file into a document formatted specifically for the supplier 240. For example, the notification may be formatted for facsimile transmittal, as specified by a specific supplier 240. Alternatively, the notification may be formatted for a proprietary supplier electronic interface. Once the confirmation and/or the notification have been transmitted, the subroutine 2000 terminates at block 2008.

With reference to FIG. 19, in another embodiment of the present invention, the reservation processing application 418 may interact with one or more suppliers 240 not connected directly to the travel management system 230. In accordance with this embodiment, the supplier interface application 268 generates a notification for the supplier 240, which is communicated via any one of a variety of communication media, such as telephone, facsimile, electronic mail, short message service, and the like. Unlike the previous embodiment (FIG. 18), the reservation processing application 272 waits to receive a confirmation from the supplier prior to permitting the client interface application 266 to send the confirmation to the client computing device 232. One skilled in the relevant art will appreciate that the embodiment illustrated in FIG. 19 permits the travel management system to interact with one or more suppliers 240 that may have limited reservation and computing resources.

Figure 25:
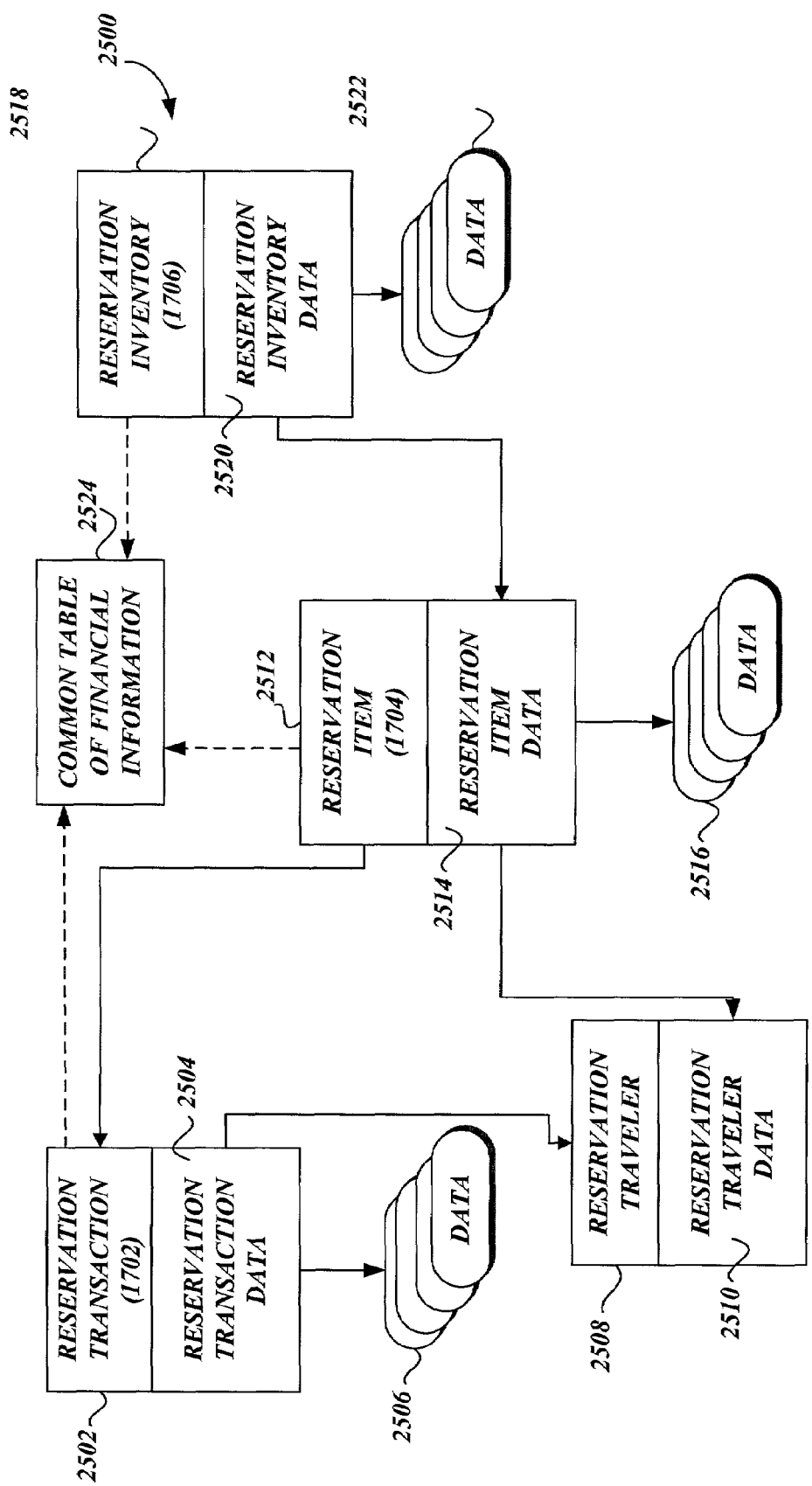
FIG. 25 is a block diagram representative of a data relationship for a reservation relational database utilized by a reservation processing application in accordance with the present invention.

In one embodiment of the present invention, the travel server 236 may store the reservation data in the data store 238, or other memory location, according to a relational database data storage format. FIG. 25 is a block diagram illustrative of a relational database data relationship 2500 utilized to store reservation data in accordance with the present invention. In an actual embodiment of the present invention, the data relationship 2500 may be customized to include one or more data tables or data fields that correspond to unique aspects of particular reservation transactions (e.g., data fields for specifying preferences for rental cars). However, one skilled in the relevant art will appreciate that alternative data storage formats or alternative relational database data relationships may be utilized in accordance with the present invention.

As illustrated in FIG. 25, the data relationship 2500 defines a reservation transaction table 2502 operable to define data related to a reservation transaction record 1702 (FIG. 17). In one embodiment of the present invention, the reservation transaction table 2502 can include reservation transaction data 2504 such as a reservation ID field, itinerary information, point of sale field, traveler user ID field, summary financial information, a creation date field, and the like. Additionally, in accordance with a relational database, one or more of the fields in the reservation transaction table 2502 may reference one or more additional data tables to further define the reservation transaction data 2504, illustrated at 2506.

The data relationship 2500 also defines a reservation traveler table 2508 operable to define data related to the user, or group of user, requesting the reservation. In an actual embodiment of the present invention, the reservation traveler table 2508 can include reservation traveler data 2510 such as a reservation ID field, name information, address information, telephone information, email information and other user identifying information.

The data relationship 2500 further defines a reservation items table 2512 operable to include reservation data corresponding to a reservation items record 1704 (FIG. 17). In an actual embodiment of the present invention, the reservation items table 2512 can include reservation items data 2514 such as a reservation ID field, confirmation information, cancellation information, consumer price information, supplier cost information, supplier notification information, change and cancellation penalty information, traveler preferences and special request information, and the like. Similar to the reservation transaction table 2502, one or more of the fields in the reservation items data 2514 may reference one or more additional data tables to further define the reservation items, illustrated at 2516.

With continued reference to FIG. 25, the data relationship 2500 defines a reservation inventory table 2518 operable to include reservation data related to a reservation inventory 1706 record (FIG. 17). In one embodiment of the present invention, the reservation inventory table 2518 can include reservation inventory data 2520 such as a reservation item ID field, supplier cost information, consumer price information, inventory identification information, and the like. Additionally, one or more of the fields in the reservation inventory data 2518 may reference one or more additional data tables to further define the reservation inventory data 2520, illustrated at 2522.

In one embodiment of the present invention, the data relationship 2500 may also include a common table of financial information 2524 that includes all consumer price and supplier cost information for the entire reservation. For example, the common table of financial information 2524 includes the consumer price and supplier cost information from the reservation transaction 1702 record, the reservation items 1704 records, and the reservation inventory 1706 records. One skilled in the relevant art will appreciate that the common table of financial information 2524 facilitates the generation of price and cost information for an entire reservation. However, the common table of financial information 2524 may be omitted in accordance with some embodiments of the present invention.

While illustrative embodiments of the invention have been illustrated and described, it will be appreciated that various changes can be made therein without departing from the spirit and scope of the invention.

The embodiments of the invention in which an exclusive property or privilege is claimed are defined as follows:

1. A method implemented in a computer device for processing an available inventory item query corresponding to inventory items defined by inventory information, the method comprising:

storing a set of available inventory information according to a three level hierarchy, wherein the three level hierarchy includes:

at least one group record defining a first level of detail for inventory information, wherein the first level of detail of each group record comprises information common to all item category records and inventory records below the group record in the hierarchy;

a set of item category records defining a second level of detail that is associated to a referenced group record and corresponds to types of inventory items for the referenced group, wherein the second level of detail of each item category record comprises information common to all inventory records below the item category record in the hierarchy;

inventory records defining a third level of detail corresponding to instances of inventory item types referenced by at least two of the set of item category records, wherein the third level of detail of each inventory record in the hierarchy describes distinct instances of inventory items than that of another inventory record, the distinct instances of inventory items including price with price adjustments applied to the price;

obtaining, by the computer device, a supplier batch inventory query, the query including a set of criteria;

determining at least one inventory item matching the supplier batch query criteria based on at least one group record, item category record and inventory record; and transmitting matching group record, item category record, and inventory record data for the matching inventory item.

2. The method as recited in claim 1, wherein determining at least one inventory item includes identifying all inventory items matching the query criteria, wherein each identified inventory item corresponds to a group record, record, and inventory record.

3. The method as recited in claim 1, wherein determining at least one inventory item includes applying a supplier limitation of use to select a corresponding group record, record, and inventory record.

4. The method as recited in claim 1, wherein determining at least one inventory item includes applying a consumer selection limitation of use to select a corresponding group record, record, and inventory record.

5. The method as recited in claim 1 further comprising processing the data associated with the identified group record, record, and inventory records prior to transmitting the data.

6. The method as recited in claim 5, wherein the instances of inventory items includes price and wherein processing the data includes generating a price corresponding to the set of query criteria.

7. The method as recited in claim 6, wherein generating a price includes generating an ordered list of prices for one or more inventory items.

8. The method as recited in claim 6, wherein generating a price includes applying any date based price adjustments based on a current date or date of use.

9. The method as recited In claim 8, wherein the date based price adjustment is a tax rate computed by a date of use.

10. The method as recited In claim 8, wherein the date based price adjustment is a service charge computed by a date of use.

11. The method as recited in claim 8, wherein the date based price adjustment is an extra person charge computed by a date of use.

12. The method as recited in claim 8, wherein the date based price adjustment is a point of sale variance computed by a date of use.

13. The method as recited in claim 5, wherein processing data includes determining an inventory availability corresponding to the set of query criteria.

14. The method as recited in claim 1, wherein the inventory includes travel-based goods and services and wherein the available inventory query includes an available travel-based goods and services query.

15. The method as recited in claim 14, wherein the query criteria include a date or date range.

16. The method as recited in claim 15, wherein the date or date range is selected by a graphical user interface.

17. The method as recited in claim 14, wherein the query criteria include a selection of a destination.

18. The method as recited in claim 14, wherein the query criteria include a selection of a hotel or hotel room-type.

19. The method as recited in claim 14, wherein the query criteria include the selection of an airline or airline flight.

20. The method as recited in claim 14, wherein the query criteria include a selection of a cruise or cabin type.

21. The method as recited in claim 14, wherein the query criteria include a selection of a car rental vendor or car type.

22. The method as recited in claim 1, wherein the available inventory query is a user-specified, available inventory query.

23. A computer-readable medium having computer-executable instructions operable for performing the method recited in anyone of claims 1-22.

24. A computer system having a processor, a memory, and an operating environment, the computer system operable for performing the method recited in any one of claims 1-22.

25. A method implemented by a computer device for processing an inventory action request corresponding to one or more inventory items defined by inventory information, the method comprising:

storing a set of available inventory information according to a three level hierarchy, wherein the three level hierarchy includes:

at least one group record defining a first level of detail for inventory information, wherein the first level of detail of each group record comprises information common to all item category records and inventory records below the group record in the hierarchy;

a set of item category records defining a second level of detail that is associated to a referenced group record and corresponds to types of inventory items for the referenced group, wherein the second level of detail includes date information associated with the inventory items, and wherein the second level of detail of each item category record comprises information common to all inventory records below the item category record in the hierarchy;

inventory records defining a third level of detail corresponding to instances of inventory item types referenced by the set of item category records, wherein the third level of detail of each inventory record in the hierarchy describes distinct inventory instances of item types than that of another inventory record, the distinct inventory instances of item types including price with price adjustments applied to the price;

obtaining, by the computer device, an inventory action request, the inventory action request including an identification of at least one specific group record, item category record, and inventory record;

processing the inventory action request; and transmitting the results of the processing of the inventory action request wherein the inventory action request includes a supplier batch inventory action request, the batch inventory action request including an identification of one or more group records, item category records, inventory records, and inventory modification data, and wherein processing the inventory action request includes:

identifying at least one group record, item category record, and inventory record corresponding to the batch inventory action request; and updating the identified at least one group record, item category record, and inventory record with the inventory modification data from the batch inventory action request.

26. The method as recited in claim 25, wherein obtaining the inventory action request includes obtaining a supplier request for inventory action.

27. The method as recited in claim 25, wherein obtaining an inventory action request includes:

issuing an inventory action request to a supplier; and obtaining a supplier confirmation inventory action request.

28. A method, implemented by a computer device for processing an inventory action request corresponding to one or more inventory items defined by inventory information, the method comprising:

storing a set of available inventory information according to a three level hierarchy, wherein the three level hierarchy includes:

at least one group record defining a first level of detail for inventory information, wherein the first level of detail of each group record comprises information common to all item category records and inventory records below the group record in the hierarchy;

a set of item category records defining a second level of detail that is associated to a referenced group record and corresponds to types of inventory items for the referenced group, wherein the second level of detail includes date information associated with the inventory items, and wherein the second level of detail of each item category record comprises information common to all inventory records below the item category record in the hierarchy;

inventory records defining a third level of detail corresponding to instances of inventory item types referenced by the set of item category records, wherein the third level of detail of each inventory record in the hierarchy describes distinct inventory instances of item types than that of another inventory record;

obtaining, by the computer device, an inventory action request, the inventory action request including an identification of at least one specific group record, item category record, and inventory record;

processing the inventory action request; and transmitting the results of the processing of the inventory action request;

wherein the inventory action request includes a supplier batch inventory action request, the batch inventory action request including an identification of one or more group records, item category records, inventory records, and inventory modification data, and wherein processing the inventory action request includes:

identifying at least one group record, item category record, and inventory record corresponding to the batch inventory action request; and updating the identified at least one group record, item category record, and inventory record with the inventory modification data from the batch inventory action request.

29. The method as recited in claim 28, wherein the modification data includes a cost code indicative of a supplier cost.

30. The method as recited in claim 28, wherein the modification data includes data indicating a maximum price that may be charged for the inventory item.

31. The method as recited in claim 28 further comprising transmitting a confirmation of the updating of the at least one inventory record.

32. The method as recited in claim 28 further comprising generating one or more inventory records corresponding to the identification data included in the batch inventory action request if no inventory records corresponding to the batch inventory action request can be identified.

33. The method as recited in claim 28 further comprising generating one or more item category records corresponding to the identification data included in the batch inventory action request if no item category records corresponding to the batch inventory action request can be identified.

34. The method as recited in claim 28, wherein the inventory action request includes a supplier inventory query action request, the supplier inventory query including one or more query criteria, and wherein processing the inventory action request includes:

determining at least one category item record and inventory record matching the query criteria; and transmitting data associated with the matching category item record and inventory records to an associated supplier.

35. The method as recited in claim 28 further comprising filtering the data associated with the matching category item record and record inventory records prior to transmitting the data.

36. The method as recited in claim 35, wherein the filtered data associated with the matching category item record, and inventory records includes utilization data corresponding to inventory items represented by the matching records.

37. The method as recited in claim 35, wherein the filtered data associated with the matching category item record, and inventory records includes a supplier cost associated with inventory items represented by the matching records.

38. The method as recited in claim 28, wherein the inventory includes travel-based goods and services, and wherein the inventory action request is a travel-based goods and services inventory action request.

39. The method as recited in claim 28 further comprising generating one or more group records corresponding to the identification data included in the batch inventory action request if no group records corresponding to the batch inventory action request can be identified.

40. A computer-readable medium having computer-executable instructions for performing the method recited in anyone of claims 25-38 and 39.

41. A computer system having a processor memory in an operating environment, the computer system operable to perform the method recited in anyone of claims 25-38 and 39.

42. A system for managing inventory utilizing inventory information, the system comprising:

at least one client computing device operable to issue a supplier batch inventory query, the query including a set of criteria;

a travel server operable to store one or more inventory items defined by inventory information in a three level hierarchy, wherein the three level hierarchy includes:

at least one group record defining a first level of detail for inventory information, wherein the first level of detail of each group record comprises information common to all item category records and inventory records below the group record in the hierarchy;

a set of item category records defining a second level of detail that is associated to a referenced group record and corresponds to types of inventory items for the referenced group, wherein the second level of detail of each item category record comprises information common to all inventory records below the item category record in the hierarchy;

inventory records defining a third level of detail corresponding to instances of inventory item types referenced by at least two of the set of item category records, wherein the third level of detail of each inventory record in the hierarchy describes distinct instances of inventory items than that of another inventory record, the distinct instances of inventory items including price with price adjustments applied to the price; and wherein the travel server is operable to identify one or more group records, item category records, and inventory records matching the supplier batch inventory query criteria submitted by the client computing device.

43. The system as recited in claim 42 further comprising at least one inventory unit supplier operable to provide the one or more inventory items by communicating with the travel server.

44. The system as recited in claim 43, wherein the inventory unit supplier provides a cost code associated with the base costs of the inventory item.

45. The system as recited in claim 42, wherein the one or more inventory items include travel-based goods and services and wherein the inventory query includes a travel-based goods and services query.

46. The system as recited in claim 45, wherein the query criteria include a date or date range.

47. The system as recited in claim 46, wherein the date or date range is selected by a graphical user interface.

48. The system as recited in claim 45, wherein the query criteria include the selection of a hotel or hotel room-type.

49. The system as recited in claim 45, wherein the query criteria include the selection of an airline carrier or airline flight.

50. The system as recited in claim 45, wherein the query criteria include the selection of a cruise or a cabin type.

51. A system for storing and managing one or more inventory items utilizing inventory information, the system comprising:

at least one inventory supplier operable to provide the one or more inventory items and to transmit at least one supplier batch inventory action request;

a travel server operable to store one or more inventory items defined by inventory information in a three level hierarchy, wherein the three level hierarchy includes:

at least one group record defining a first level of detail for inventory information, wherein the first level of detail of each group record comprises information common to all item category records and inventory records below the group record in the hierarchy;

a set of item category records defining a second level of detail that is associated to a referenced group record and corresponds to types of inventory items for the referenced group, wherein the second level of detail includes date information associated with the inventory items, wherein the second level of detail of each item category record comprises information common to all inventory records below the item category record in the hierarchy;

inventory records defining a third level of detail corresponding to instances of inventory item types referenced by the set of item category records, wherein the third level of detail of each inventory record in the hierarchy describes distinct instances of inventory items than that of another inventory record, the distinct instances of inventory items including price with price adjustments applied to the price; and wherein the travel server is operable to communicate with the inventory suppliers and process the supplier batch inventory action requests corresponding to the one or more group records, item category records, and inventory records and wherein the travel server processes the supplier batch inventory unit request according to the item category record and inventory records.

52. The system as recited in claim 51, wherein the one or more inventory items and travel-based goods and services and wherein the inventory action request includes a travel-based goods and services inventory action request.

53. The system as recited in claim 52, wherein the inventory action request includes the transmission of an inventory status query and wherein the travel server processes the inventory status query according to the item category record and inventory records.

54. The system as recited in claim 53, wherein the travel server processes the inventory status query to include utilization information.

55. The system as recited in claim 51, wherein the travel server is further operable to initiate an inventory action request and transmit the inventory action request to the inventory supplier.

56. The system as recited in claim 51, wherein at least one inventory supplier is not continuously connected to the system and wherein the travel server transmits a confirmation for all inventory action requests.

* * * * *